United States Patent
Lu

(10) Patent No.: US 11,485,497 B2
(45) Date of Patent: Nov. 1, 2022

(54) DIVIDED REFRIGERATION SYSTEM FOR AIRCRAFT GALLEY COOLING

(71) Applicant: B/E Aerospace, Inc., Winston Salem, NC (US)

(72) Inventor: Qiao Lu, Placentia, CA (US)

(73) Assignee: B/E Aerospace, Inc., Winston-Salem, NC (US)

( * ) Notice: Subject to any disclaimer, the term of this patent is extended or adjusted under 35 U.S.C. 154(b) by 132 days.

(21) Appl. No.: 16/296,739

(22) Filed: Mar. 8, 2019

(65) Prior Publication Data

US 2021/0139151 A1     May 13, 2021

(51) Int. Cl.

| | |
|---|---|
| B64D 11/04 | (2006.01) |
| F25B 41/24 | (2021.01) |
| B64D 13/08 | (2006.01) |
| F25B 41/20 | (2021.01) |
| F25B 41/40 | (2021.01) |
| B64D 13/06 | (2006.01) |

(52) U.S. Cl.
CPC .............. B64D 11/04 (2013.01); B64D 13/08 (2013.01); F25B 41/20 (2021.01); F25B 41/24 (2021.01); F25B 41/40 (2021.01); *B64D 2013/0629* (2013.01)

(58) Field of Classification Search
CPC .......... F16L 37/34; F16L 37/60; B64D 13/08; B64D 11/04; B64D 2013/0629; A47B 2031/023
See application file for complete search history.

(56) References Cited

U.S. PATENT DOCUMENTS

| | | | |
|---|---|---|---|
| 4,290,276 A | 9/1981 | Knowles | |
| 6,845,627 B1* | 1/2005 | Buck | B64D 11/04 |
| | | | 165/919 |
| 8,850,832 B2* | 10/2014 | Lingrey | F24F 1/20 |
| | | | 62/77 |
| 2003/0192335 A1* | 10/2003 | Rembold | F25B 41/003 |
| | | | 62/292 |
| 2005/0210910 A1* | 9/2005 | Rigney | B60H 1/32281 |
| | | | 62/407 |

(Continued)

FOREIGN PATENT DOCUMENTS

| | | |
|---|---|---|
| DE | 19952523 A1 | 5/2001 |
| EP | 0655593 A1 | 5/1995 |

(Continued)

OTHER PUBLICATIONS

EP Search Report for European Application No. 20161778.4 dated Aug. 6, 2020, 6 pages.

*Primary Examiner* — Cassey D Bauer

(74) *Attorney, Agent, or Firm* — Suiter Swantz pc llo

(57) ABSTRACT

A divided aircraft galley refrigeration system is disclosed. In embodiments, the system includes an evaporating unit positioned within an aircraft galley. In another embodiment, the system includes a refrigeration and heat discharge unit positioned outside of the aircraft galley. In another embodiment, the system includes a liquid refrigerant pipe configured to fluidically couple the evaporating unit and the refrigeration and heat discharge unit. In another embodiment, the system includes a vapor refrigerant pipe configured to fluidically couple the evaporating unit and the refrigeration and heat discharge unit.

16 Claims, 15 Drawing Sheets

(56) References Cited

U.S. PATENT DOCUMENTS

| | | | |
|---|---|---|---|
| 2013/0047657 A1* | 2/2013 | Oswald | B64D 11/04 |
| | | | 29/402.01 |
| 2013/0292102 A1* | 11/2013 | Trumper | B64D 13/08 |
| | | | 165/168 |
| 2014/0008037 A1* | 1/2014 | Trumper | F28F 27/00 |
| | | | 165/96 |
| 2015/0007600 A1 | 1/2015 | Godecker et al. | |
| 2015/0089968 A1 | 4/2015 | Lu et al. | |
| 2016/0231030 A1 | 8/2016 | Lu et al. | |
| 2017/0261140 A1* | 9/2017 | Gennasio | F16L 37/23 |

FOREIGN PATENT DOCUMENTS

| | | | | |
|---|---|---|---|---|
| EP | 2687794 A2 | | 1/2014 | |
| JP | 2016-537599 | * | 12/2016 | F25B 25/005 |
| WO | 2007084138 A1 | | 7/2007 | |

\* cited by examiner

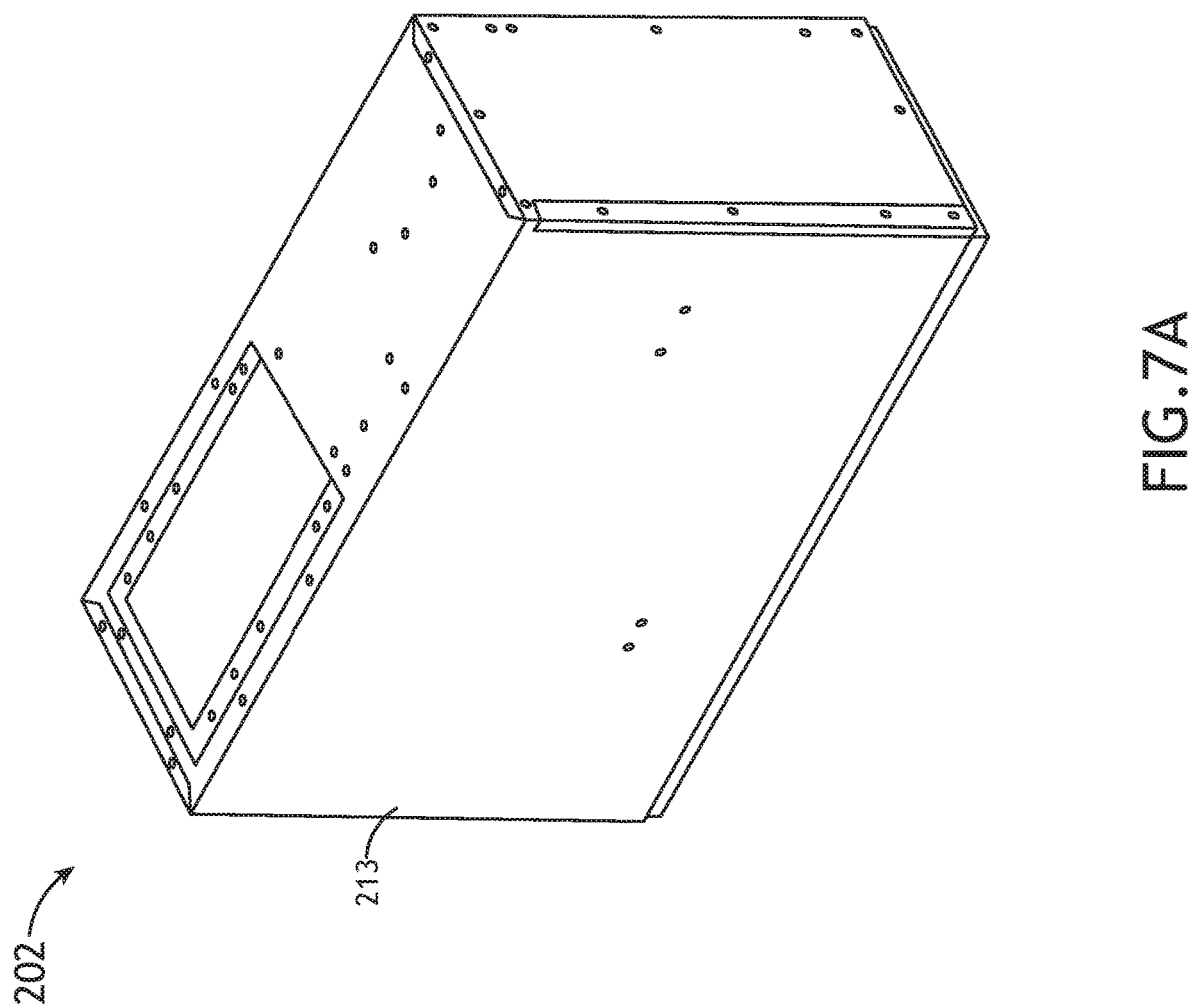

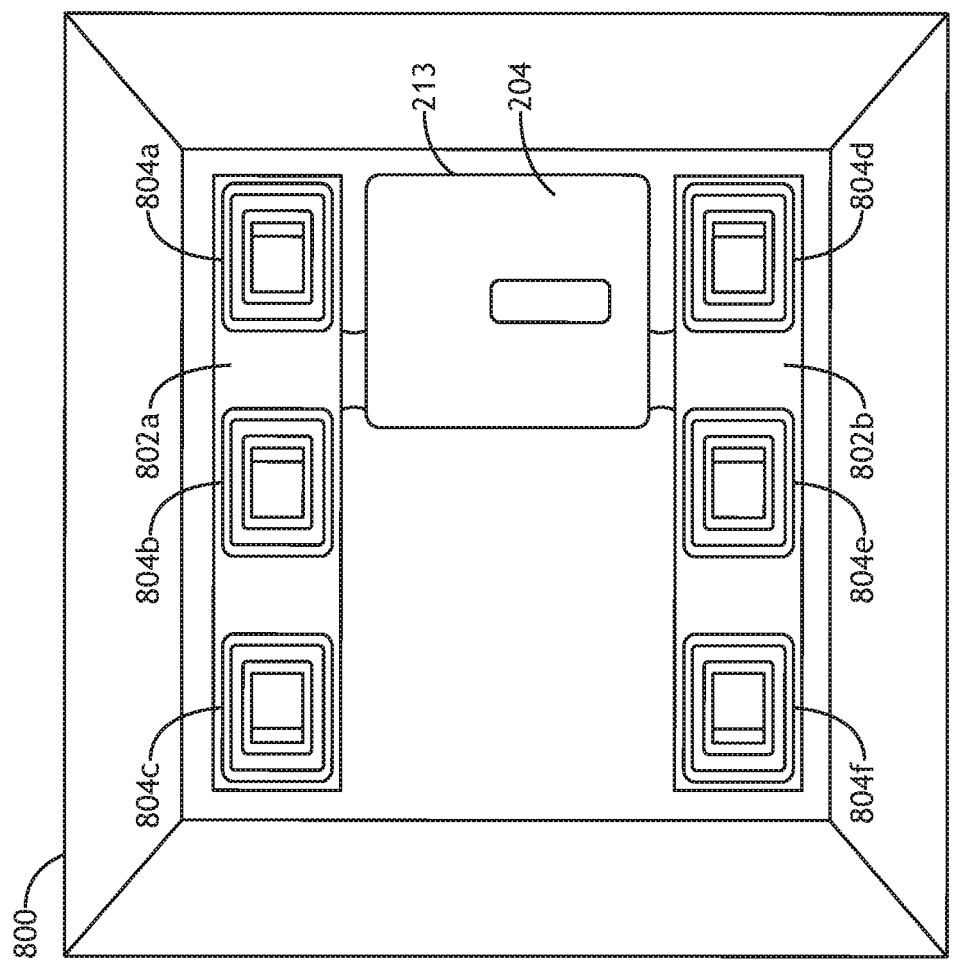

DIVIDED REFRIGERATION SYSTEM FOR AIRCRAFT GALLEY COOLING

BACKGROUND

There is a pervasive need in the art for aircraft galley refrigeration systems which are smaller, lighter, and more efficient. Traditional aircraft galley refrigeration systems may generate large amount of heat, requiring the refrigeration systems to perform more work in order to maintain the same aircraft galley temperature. Additionally, some traditional aircraft galley refrigeration systems are heavy and bulky, which substantially increase the overall weight of the aircraft. Furthermore, there is only a limited amount of available space within an aircraft galley. The large space requirements for traditional aircraft galley refrigeration systems is undesirable, as any space consumed by the aircraft galley refrigeration system amounts to space which may otherwise be used for additional storage and/or additional appliances or features. Therefore, it would be desirable to provide a system and method that cure one or more the shortfalls of the previous approaches identified above.

SUMMARY

A divided aircraft galley refrigeration system is disclosed. In embodiments, the system includes an evaporating unit positioned within an aircraft galley. In another embodiment, the system includes a refrigeration and heat discharge unit positioned outside of the aircraft galley. In another embodiment, the system includes a liquid refrigerant pipe configured to fluidically couple the evaporating unit and the refrigeration and heat discharge unit. In another embodiment, the system includes a vapor refrigerant pipe configured to fluidically couple the evaporating unit and the refrigeration and heat discharge unit.

A system is disclosed. In embodiments, the system includes an evaporating unit positioned within an aircraft galley. In embodiments, the evaporating unit is fluidically couplable to a refrigeration and heat discharge unit positioned outside of the aircraft galley via a liquid refrigerant pipe and a vapor refrigerant pipe.

A method is disclosed. In embodiments, the method includes directing chilled air into an aircraft galley with an evaporating unit positioned within the aircraft galley; circulating vapor refrigerant from the evaporating unit to a refrigeration and heat discharge unit positioned outside of the aircraft galley via a vapor refrigerant pipe; compressing and condensing the vapor refrigerant into a liquid refrigerant with the refrigeration and heat discharge unit; and circulating the liquid refrigerant from the refrigeration and heat discharge unit to the evaporating unit via a liquid refrigerant pipe.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings:

FIG. 7A illustrates a perspective view of a refrigeration and heat discharge unit in a vertical configuration, in accordance with an example embodiment of the present disclosure.

FIG. 8 illustrates an evaporating unit of a divided aircraft galley refrigeration system installed within a chilled galley compartment, in accordance with an example embodiment of the present disclosure.

DETAILED DESCRIPTION

Figure 1:
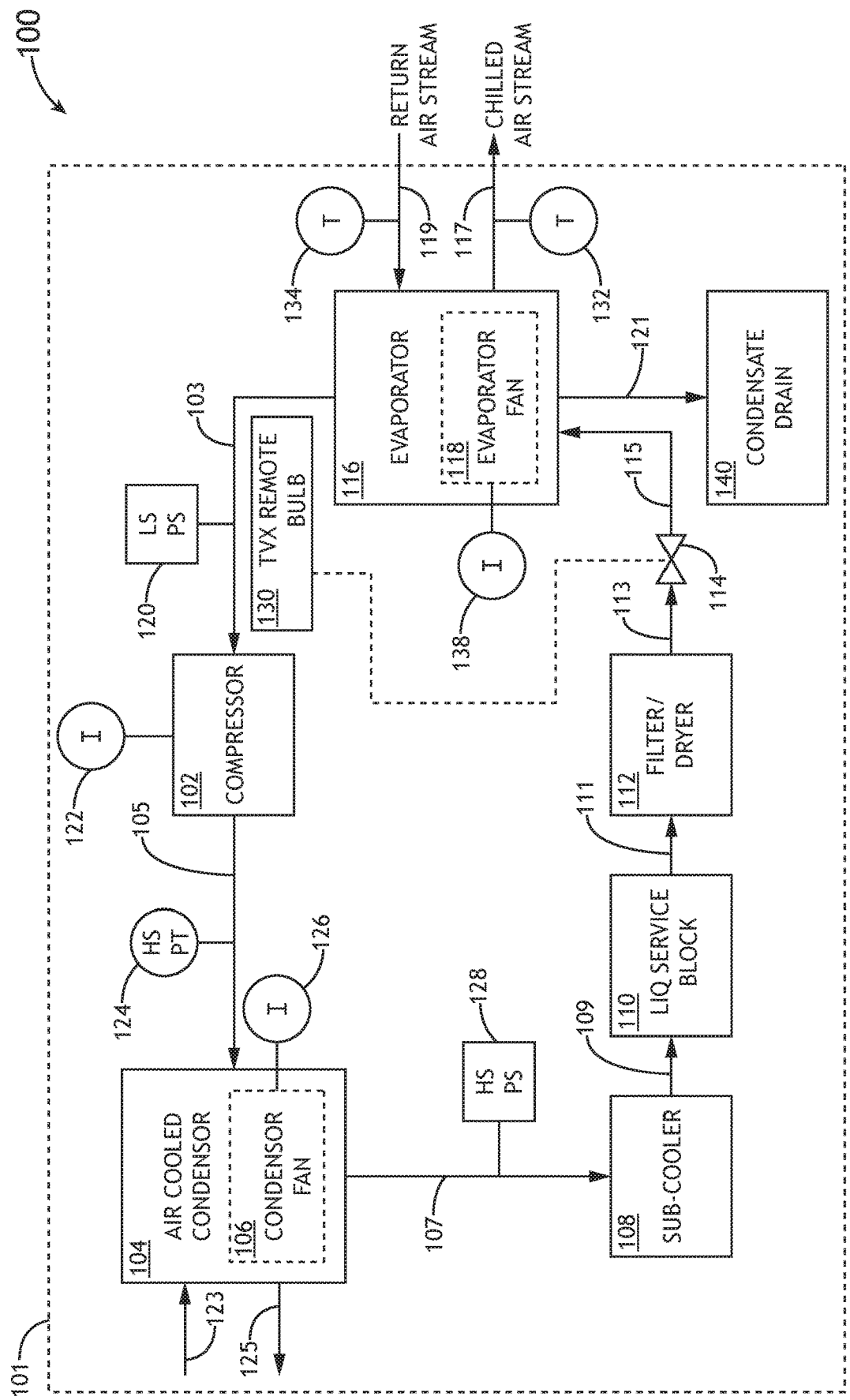
FIG. 1 illustrates a simplified flow diagram of an aircraft galley refrigeration system.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, directional terms such as "top," "bottom," "over," "under," "upper," "upward," "lower," "down," "downward," and similar terms, are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Additionally, as used herein, a letter following a reference numeral is intended to reference an embodiment of the feature or element that may be similar, but not necessarily identical, to a previously described element or feature bearing the same reference numeral (e.g., 1, 1A, 1B). Such shorthand notations are used for purposes of convenience only, and should not be construed to limit the inventive concepts disclosed herein in any way unless expressly stated to the contrary.

Finally, as used herein any reference to "one embodiment," or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination of sub-combination of two or more such features, along with any other features which may not necessarily be expressly described or inherently present in the instant disclosure.

Broadly, embodiments of present disclosure are directed to an aircraft galley refrigeration system. More particularly, embodiments of the present disclosure are directed to a divided aircraft galley refrigeration system, in which an evaporating unit is positioned within an aircraft galley, and a refrigeration and heat discharge unit is positioned outside of the aircraft galley. Further embodiments of the present disclosure are directed to a flexible vapor refrigerant pipe and a flexible liquid refrigerant type which are configured to fluidically couple the evaporating unit and the refrigeration and heat discharge unit.

It is contemplated herein that the divided aircraft refrigeration system of the present disclosure may provide a number of advantages over previous refrigeration systems. First, by positioning the refrigeration and heat discharge unit at a location which is outside of a chilled aircraft galley compartment, the system of the present disclosure may prevent the introduction of warm/hot air into the chilled aircraft galley compartment, which may lead to improved performance of the evaporating unit. Additionally, by placing the refrigeration and heat discharge unit outside of the aircraft galley, space within the aircraft galley may be maximized. Furthermore, due to the fac that the evaporating unit of the divided aircraft galley refrigeration system may operate more efficiently, the overall size and weight of the evaporating unit may be reduced, leading to further available space in the aircraft galley, and a reduction in the overall weight of the aircraft.

Referring generally to FIGS. 1-10, a divided aircraft galley refrigeration system 100 is described, in accordance with example embodiments of the present disclosure.

FIG. 1 illustrates a simplified flow diagram of an aircraft galley refrigeration system 100. It is noted herein that the aircraft galley refrigeration system 100 is provided to generally illustrate components and operation of an aircraft galley refrigeration system 100 such that the inventive concepts of the present disclosure may be more clearly understood.

Aircraft galley refrigeration system 100 may include a vapor cycle system including various motors, valves, and other components which may be controlled by one or more processors of a controller in response to data received from a plurality of sensors within system 100. In embodiments, system 100 includes, but is not limited to, a compressor 102, an air-cooled condenser 104, a condenser fan 106, a sub-cooler 108, a liquid service block 110, a filter/dryer assembly 112, an expansion valve 114, an evaporator 116, and an evaporator fan 118.

In embodiments, the various components of the system 100 are contained within a single refrigeration system housing 101. In traditional aircraft galley refrigeration systems, the refrigeration system housing 101 may be positioned within the aircraft galley. Various components of the system 100 (e.g., compressor 102, condenser 104, sub-cooler 108, evaporator 116, and the like) are connected by refrigerant tubing/piping which is configured to contain the refrigerant used by system 100 and direct the refrigerant between the various components of the system 100. The refrigerant used by system 100 may include any refrigerant known in the art. For example, the refrigerant may include, but is not limited to, R-134a, R404A, R236fa, R1234yf, and R513A, and the like.

In operation, vapor refrigerant is directed from the evaporator 116 to the compressor 102 as stream 103, and enters the compressor 102 at low temperature and low vapor pressure. Stream 103 may include a low side pressure switch 120 (LSPS 120). The low-side pressure switch 120 may be configured to turn off system 100 when the low side refrigerant pressure is lower than a particular pressure threshold. For example, the low-side pressure switch 120 may be configured to turn off system 100 when the low side refrigerant pressure is lower than 5 psig. The compressor 102 is configured to compress the vapor from stream 103. As the vapor is compressed by compressor 102, the temperature and pressure of the vapor refrigerant rise significantly such that the refrigerant may condense at ambient temperatures. In embodiments, the compressor 102 may include a current sensor 122 configured to collect current readings (current data) from the compressor 102. The current sensor 122 may be configured to transmit collected data to the system controller.

Refrigerant exits the compressor 102 as a stream 105, and may be in a superheated vapor form. Stream 105 is then directed to the condenser 104 via refrigerant tubing/piping. Stream 105 may include a high-side pressure transducer 124 (HSPT 124). Within the condenser 104, heat from the refrigerant (e.g., superheated vapor refrigerant) is rejected and the refrigerant is condensed into a high pressure, saturated liquid. Condenser 104 may include any condenser known in the art including, but not limited to, an air-cooled condenser. For example, condenser 104 may be air-cooled by use of condenser fan 106, which receives a condenser air input stream 123 from the surrounding environment (e.g., aircraft galley) and exhausts a condenser air output stream 125 from the refrigeration system housing 101. In this regard, housing 101 may include one or more vents configured to allow for the passage of air streams (e.g., condenser air input stream 123, condenser air output stream 125) into and out of the housing 101, and to facilitate a negative pressure created by the condenser fan 106. The condenser fan may include a current sensor 126 configured to collect current readings (current data) from the condenser fan 106. The current sensor 122 may then be configured to transmit collected data to the system controller.

Following the condenser 104, refrigerant may be directed to a condenser sub-cooling device (e.g., sub-cooler 108) as a stream 107. It is noted herein that the refrigerant within stream 107 may include a high-temperature, high-pressure refrigerant. In this regard, it is contemplated herein that the tubing/piping containing and directing stream 107 is formed from a material which is compatible with high-temperature, high-pressure liquids/gasses. Stream 107 may additionally include a high-side pressure switch 128 (HSPS 128). The high-side pressure switch 128 may be configured to turn off system 100 when the high side refrigerant pressure is greater than a particular pressure threshold. For example, The high-side pressure switch 128 may be configured to turn off system 100 when the high side refrigerant pressure is greater than 325 psig.

The sub-cooler 108 may be disposed in the high-temperature, high-pressure portion of the refrigerant tubing, and may be configured to sub-cool the refrigerant following the condenser 104. The sub-cooler 108 may cool the hot refrigerant of stream 107, effectively pre-cooling the refrigerant prior to entering the expansion valve 114. It is noted herein that pre-cooling the refrigerant prior to the expansion valve 114 may increase the effectiveness of the evaporator 116.

Sub-cooled refrigerant may exit the sub-cooler 108 as a stream 109. In some embodiments, stream 109 exiting the sub-cooler 108 may be directed to a liquid service block 110. The service block 110 may include a sight glass. Stream 111 may then direct liquid refrigerant from the liquid service block 110 to a filter/drier assembly 112. The filter/drier assembly 112 may be configured to remove any solid and/or liquid contaminants from the liquid refrigerant. In embodiments, A stream 113 may direct liquid refrigerant from the filter/dryer assembly 112 to an expansion valve 114. In embodiments, although not shown in FIG. 1, a heat exchanger configured to receive stream 103 and stream 113 may be used to further sub-cool stream 113 (and pre-heat stream 103). In particular, the refrigerant heat exchanger may perform a refrigerant liquid sub-cooling (stream 113) and refrigerant vapor superheating (stream 103) process by which the refrigerant passing from the filter/drier assembly 112 to the expansion valve 114 via stream 113 transfers heat to the refrigerant passing from the evaporator 116 to the compressor 102. By superheating the refrigerant before entering the compressor 102, liquid droplets may be prevented from entering the compressor 102.

The expansion valve 114 may be configured to receive stream 113 and drop the pressure of the refrigerant to a pressure corresponding to a defined operating state and/or temperature set-point of the refrigeration system 100. In operation, the expansion valve 114 may be configured to cause a sudden decrease in pressure of the liquid refrigerant, thereby causing flash evaporation of a portion of the liquid refrigerant. Expansion valve 114 may include any expansion valve known in the art including, but not limited to, a block-type expansion valve with an internal sensing bulb. The expansion valve 114 may also be coupled with a thermal expansion remote bulb 130 (TXV remote bulb 130). The TXV remote bulb 130 may be fluidically coupled to the expansion valve 114 via a capillary tube which communicates a working gas between the expansion valve 114 and the TXV remote bulb 130. The TXV remote bulb is located near the evaporator 116 outlet, and attached to Stream 103. In this regard, the TXV remote bulb 130 may be configured to respond to the temperature of the refrigerant leaving the evaporator 116. Thus, the expansion valve 114 may serve as a thermostatic expansion valve and operate to control a flow of refrigerant into the evaporator 116 according to the temperature of the refrigerant leaving the evaporator 116.

Following the expansion valve 114, refrigerant is directed to the evaporator 116 as a cold liquid/vapor mixture in stream 115. As the low temperature and low pressure refrigerant moves through the evaporator 116, the refrigerant absorbs the heat from the evaporator 116 and lowers the temperature of the evaporator 116 fins. An evaporator fan 118 may then be configured to direct the chilled air out of the evaporator 116 as a chilled air stream 117 that chills the interior of a compartment with which the refrigeration system 100 is coupled (e.g., aircraft galley). Warm air inside the aircraft galley may enter the evaporator 116 as a return air stream 119. The evaporator fan 118 may then be further configured to circulate the return air stream 119 through the evaporator fins (e.g., evaporator 116) to be cooled and be output from the evaporator 116 as chilled air stream 117. Chilled air stream 117 may include a temperature sensor 132 configured to collect temperature data of the chilled air stream 117 and transmit collected data to the system controller. Similarly, return air stream 119 may include a temperature sensor 134 configured to collect temperature data of the return air stream 119 and transmit collected data to the system controller. It is noted herein that temperature sensors 132, 134 may include any temperature sensor known in the art including, but not limited to, thermistors, thermocouples, and the like.

In embodiments, the evaporator 116 may be located adjacent the destination (e.g., a refrigerated food storage compartment in a galley cart) for the chilled air exiting the evaporator 116 such that air ducts may efficiently route the chilled air stream 117 to the destination and route the return air stream 119 back from the destination. In embodiments, the evaporator fan 118 may include a current sensor 138. Current sensor 138 may be configured to transmit collected data to the system controller.

The transfer of thermal energy between the return air stream 119 circulating past fins of the evaporator 116 and the refrigerant flowing within the evaporator 116 converts the liquid refrigerant to vapor, which is then directed to the compressor 102 as stream 103, as noted previously herein. Furthermore, as the warm return air stream 119 passes over the cold surface of the evaporator 116, moisture in the air condenses on the evaporator fins in the form of condensate, which is then drained from the evaporator 116 to the condensate drain 140 as condensate stream 121 and discarded.

A more detailed explanation of the refrigeration system 100 is provided by Qiao Lu, William Godecker, and Richard Rigney in U.S. patent application Ser. No. 15/134,020, entitled VEHICLE REFRIGERATION EQUIPMENT HAVING A VAPOR CYCLE SYSTEM, filed Apr. 20, 2016, which is incorporated herein by reference in the entirety.

Figure 2:
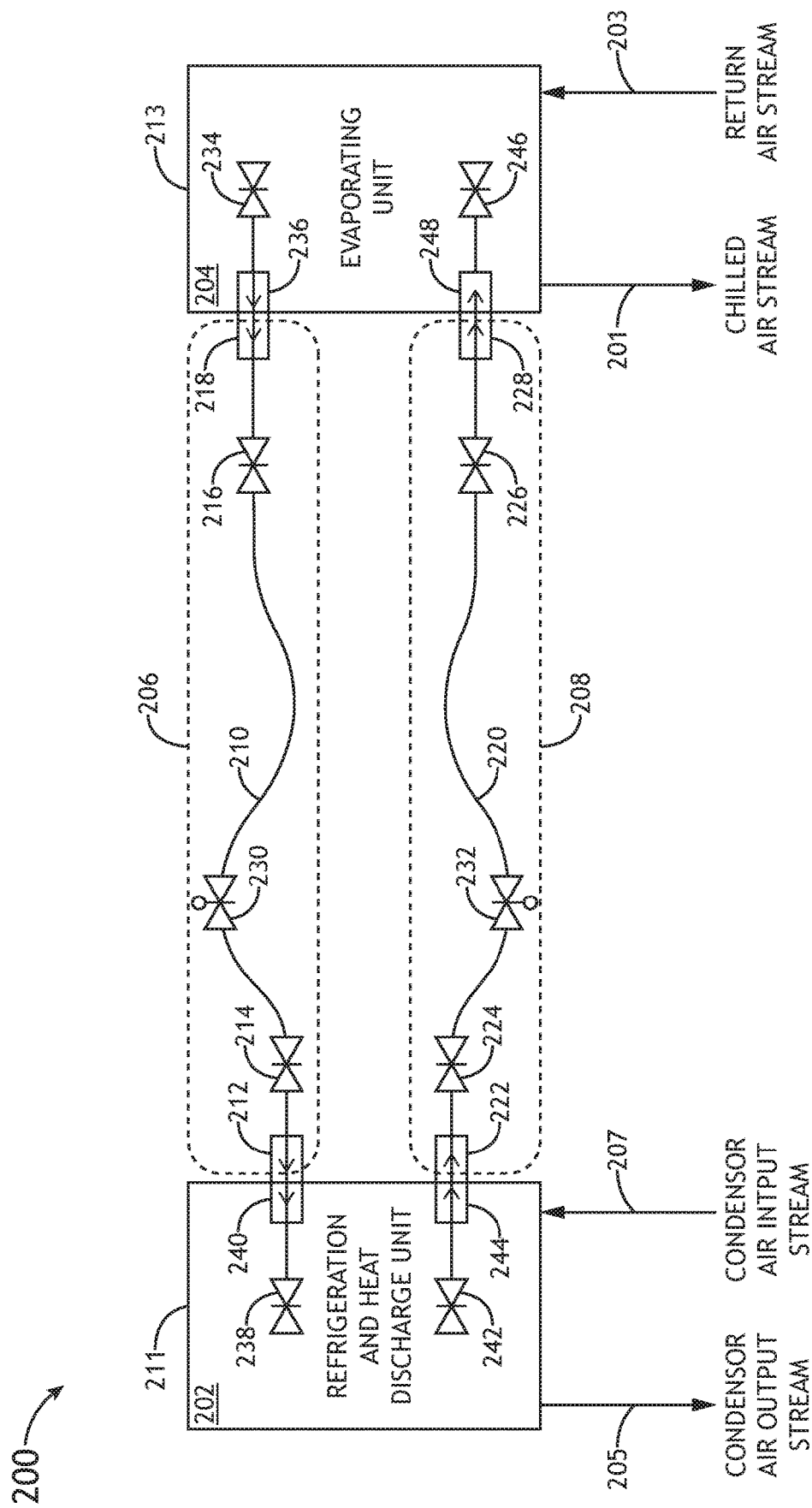
FIG. 2 illustrates a simplified flow diagram of a divided aircraft galley refrigeration system, in accordance with an example embodiment of the present disclosure.

FIG. 2 illustrates a simplified flow diagram of a divided aircraft galley refrigeration system 200, in accordance with an example embodiment of the present disclosure. The divided aircraft galley refrigeration system 200 may include, but is not limited to, a refrigeration and heat discharge unit 202, an evaporating unit 204, a vapor refrigerant return 206, and a liquid refrigerant return 208.

As noted previously herein, embodiments of the present disclosure are directed to a divided aircraft galley refrigeration system 200 in which the evaporating unit 204 is positioned within an aircraft galley, and the refrigeration and heat discharge unit 202 is positioned outside of the aircraft galley. In this regard, the evaporating unit 204 may be configured to receive a return air stream 203 and produce a chilled air stream 201 in order to chill at least a portion of the aircraft galley. Conversely, the refrigeration and heat discharge unit 202 positioned outside of the aircraft galley may be configured to receive a condenser air input stream 207 and produce a condenser air output stream 205, which is directed to a location which is outside of the aircraft galley.

In embodiments, the refrigeration and heat discharge unit 202 and the evaporating unit 204 are fluidically coupled via a vapor refrigerant return 206 and a liquid refrigerant return 208. The vapor refrigerant return 206 may include, but is not limited to, a vapor refrigerant pipe 210, a quick disconnect assembly 212, a stop valve 214, a stop valve 216, and a quick disconnect assembly 218. Similarly, the vapor refrigerant return 208 may include, but is not limited to, a liquid refrigerant pipe 220, a quick disconnect assembly 222, a stop valve 224, a stop valve 226, and a quick disconnect assembly 228.

For the purposes of simplicity, the combined stop valve and quick disconnect assemblies may be generally and collectively referred to as a "stop valve-quick disconnect apparatus." In this regard, a "stop valve-quick disconnect apparatus" may be regarded as referring to a stop valve disposed on a refrigerant line proximate to a quick disconnect assembly disposed at the end of the refrigerant line. For instance, as shown in FIG. 2, the stop valve 214 and the quick disconnect assembly 212 of the vapor refrigerant pipe 210 may be referred to as a single "stop valve-quick disconnect apparatus.

In some embodiments, the vapor refrigerant pipe 210 and/or the liquid refrigerant pipe 220 may include precharged pipes. In this regard, the vapor refrigerant pipe 210 and/or the liquid refrigerant pipe 220 may include charge valves 230, 232 configured to receive refrigerant.

In embodiments, the vapor refrigerant return 206 is configured to direct vapor refrigerant from the evaporating unit 204 to the refrigeration and heat discharge unit 202. For example, as shown in FIG. 2, the evaporating unit 204 may include a stop valve 234 and a quick disconnect assembly 236 at a vapor refrigerant output port of the evaporating unit 204. The quick disconnect assembly 236 may be couplable to the quick disconnect assembly 218 coupled to the vapor refrigerant pipe 210. Continuing with the same example, the refrigeration and heat discharge unit 202 may include a stop valve 238 and a quick disconnect assembly 240 at a vapor refrigerant inlet port. The quick disconnect assembly 212 coupled to the vapor refrigerant pipe 210 may be couplable to the quick disconnect assembly 240 of the refrigeration and heat discharge unit 202. In this regard, the vapor refrigerant return 206 may be configured to fluidically couple the evaporating unit 204 and the refrigeration and heat discharge unit 202.

In embodiments, the liquid refrigerant return 208 is configured to direct liquid refrigerant from the refrigeration and heat discharge unit 202 to the evaporating unit 204. For example, as shown in FIG. 2, the refrigeration and heat discharge unit 202 may include a stop valve 242 and a quick disconnect assembly 244 at a liquid refrigerant output port of the refrigeration and heat discharge unit 202. The quick disconnect assembly 244 may be couplable to the quick disconnect assembly 222 coupled to the liquid refrigerant pipe 220. Continuing with the same example, the evaporating unit 202 may include a stop valve 246 and a quick disconnect assembly 248 at a liquid refrigerant inlet port. The quick disconnect assembly 228 coupled to the liquid refrigerant pipe 220 may be couplable to the quick disconnect assembly 248 of the evaporating unit 204. In this regard, the liquid refrigerant return 208 may be configured to fluidically couple the refrigeration and heat discharge unit 202 and the evaporating unit 204.

The various quick disconnect assemblies 212, 218, 222, 228, 236, 240, 244, 248 may include any quick disconnect assemblies known in the art configured to fluidically couple the components of system 200. It is further contemplated, however, that the various components of system 200 (e.g., refrigeration and heat discharge unit 202, evaporation unit 204, vapor refrigerant pipe 210, liquid refrigerant pipe 220) may be fluidically couplable using any permanent, semi-permanent, or temporary mechanism known in the art, unless noted otherwise herein.

In embodiments, the vapor refrigerant pipe 210 and/or the liquid refrigerant pipe 220 may include flexible pipes. For example, the vapor refrigerant pipe 210 and/or the liquid refrigerant pipe 220 may include flexible, braided stainless steel, copper, and/or aluminum pipes. The use of flexible pipes may allow the vapor refrigerant pipe 210 and/or the liquid refrigerant pipe 220 to be bent and/or twisted through spaces of varying shapes and sized, thereby allowing system 200 of the present disclosure to be easily and readily connected and/or disconnected, as well as enabling system 200 to be retrofitted into existing aircraft galleys.

In embodiments, system 200 may further include electrical wiring configured to electrically couple the refrigeration and heat discharge unit 202 and the evaporating unit 204. It is contemplated herein that electrical wiring may be disposed on and/or within vapor refrigerant pipe 210 and/or liquid refrigerant pipe 220. Coupling electrical wiring to flexible pipes of vapor refrigerant return 206 and/or liquid refrigerant return 208 may provide for flexible connectivity between the refrigeration and heat discharge unit 202 and the evaporating unit 204. Additionally, by coupling electrical wiring to the vapor refrigerant pipe 210 and/or liquid refrigerant pipe 220, space requirements of system 200 may be reduced, and the process of coupling and/or de-coupling the refrigeration and heat discharge unit 202 and the evaporating unit 204 may be streamlined.

It is noted herein that the configuration of the divided aircraft galley refrigeration system 200 depicted in FIG. 2 may provide a number of advantages over prior galley refrigeration systems. First, by positioning the refrigeration and heat discharge unit 202 outside of the aircraft galley, space within the aircraft galley may be more efficiently utilized for additional storage and/or appliances. Secondly, positioning the refrigeration and heat discharge unit 202 outside of the aircraft galley enables the divided aircraft galley refrigeration system 200 to exhibit improved efficiency and thermal management characteristics as compared to prior approaches. For example, as shown in FIG. 1, prior approaches place all the components of system 100 (e.g., compressor 102, evaporator 116, and condenser 104) within the aircraft galley. In this regard, the condenser 104 is configured to generate a warm and/or hot condenser air output stream 125, which is directed into the aircraft galley, which the evaporator 116 is working to cool. Accordingly, by placing the condenser 104 and the evaporator 116 both in a chilled compartment of the aircraft galley, evaporators 116 of prior approaches were required to perform additional work in order to achieve the same cooling capabilities due to the fact that the condenser 104 was introducing hot air into the chilled compartment. Comparatively, as shown in FIG. 2, by placing the refrigeration and heat discharge unit 202 outside of the aircraft galley, system 200 of the present disclosure prevents the introduction of the warm and/or hot condenser air output stream 205 into the chilled compartment of the aircraft galley. Accordingly, the evaporating unit 204 may exhibit improved performance. Additionally, placing the refrigeration and heat discharge unit 202 outside of the aircraft galley may allow for the refrigeration and heat discharge unit 202 to be placed proximate to a thermal sink, thereby enabling improved efficiency of the refrigeration and heat discharge unit 202. Overall, improved efficiencies within both the refrigeration and heat discharge unit 202 and the evaporating unit 204 lead to cost savings. Furthermore, due to the fact that the evaporating unit 204 may be required to perform less work to achieve the same cooling performance, it is contemplated herein that the size of the evaporating unit 204 may be reduced, further optimizing space within the aircraft galley.

The configuration of the divided aircraft galley refrigeration system 200 may further provide a more enjoyable experience for aircraft personnel and passengers. By positioning the refrigeration and heat discharge unit 202 outside of the aircraft galley, noise within the aircraft galley and/or cabin may be reduced, thereby reducing ambient noise and providing a more relaxing and enjoyable flying experience.

Figure 3:
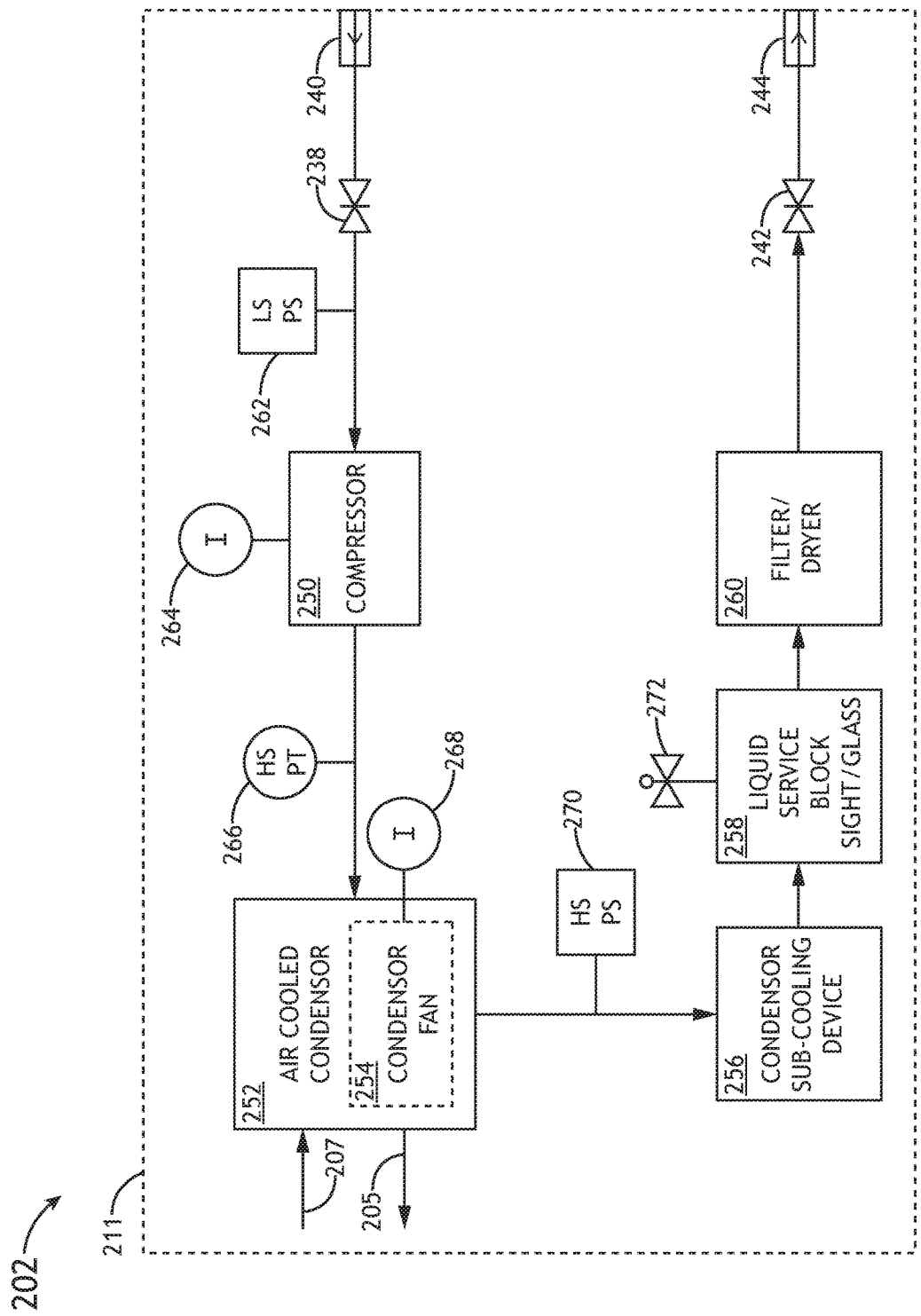
FIG. 3 illustrates a simplified flow diagram of a portion of a divided aircraft galley refrigeration system, in accordance with an example embodiment of the present disclosure.

FIG. 3 illustrates a simplified flow diagram of a portion of a divided aircraft galley refrigeration system 200, in accordance with an example embodiment of the present disclosure. Specifically, FIG. 3 illustrates the refrigeration and heat discharge unit 202 of the divided aircraft galley refrigeration system 200, in accordance with an example embodiment of the present disclosure.

In embodiments, the refrigeration and heat discharge unit 202 may include, but is not limited to, a compressor 250, a condenser 252, a condenser fan 254, a sub-cooler 256, a service block 258, and a filter/dryer assembly 260. The refrigeration and heat discharge unit 202 may further include the quick disconnect assembly 240, the stop valve 238, a low-side pressure switch 262 (LSPS 262), a current sensor 264, a high-side pressure transducer 266 (HSPT 266), a current sensor 268, a high-side pressure switch 270 (HSPS 270), and a charge valve 272. In embodiments, the components of the refrigeration and heat discharge unit 202 may be contained within a single housing 211. For example, as noted previously herein, components of the refrigeration and heat discharge unit 202 may be disposed within a housing 211, which is positioned outside of the aircraft galley. Furthermore, as noted previously herein with respect to FIG. 2, the quick disconnect assembly 240 may be disposed at a vapor refrigerant inlet port of the housing 211 of the refrigeration and heat discharge unit. Similarly, quick disconnect assembly 244 may be disposed at a liquid refrigerant outlet port of the housing 211 of the refrigeration and heat discharge unit 202. Quick disconnect assemblies 240, 244 may be configured to be couplable to the disconnect assemblies 212, 222 of the vapor refrigerant return 206 and the liquid refrigerant return 208, respectively.

It is noted herein that any discussion associated with the various components and streams of system 100 depicted in FIG. 1 may be regarded as applying to the various components and streams of the refrigeration and heat discharge unit 202 depicted in FIG. 3, unless noted otherwise herein.

Table 1 below illustrates example operating metrics for the refrigeration and heat discharge unit 202, in accordance with one or more embodiments of the present disclosure. In particular, Table 1 illustrates various performance metrics for two separate design iterations of the refrigeration and heat discharge unit 202 (e.g., Design 1, and Design 2), in both IP and SI units.

TABLE 1

| | | Refrigeration and Heat Discharge Unit Performance | | | | | |
|---|---|---|---|---|---|---|---|
| Row | Measured Characteristic | IP Unit | Design 1 | Design 2 | SI Unit | Design 1 | Design 2 |
| 1 | Compressor displacement | Cub in/rev | 0.607 | 0.607 | Cub cm/rev | 9.947 | 9.947 |
| 2 | Compressor speed, synchronous | RPM | 5955 | 5868 | RPM | 5955 | 5868 |
| 3 | Compressor speed | RPM | 5657 | 5575 | RPM | 5657 | 5575 |
| 4 | Refrigerant flow rate | lb/min | 1.078 | 1.161 | kg/min | 0.489 | 0.527 |
| 5 | Power, Compressor | w | 952.1 | 1070 | w | 952.1 | 1070 |
| 6 | Condensing pressure | Psia | 180.7 | 218.2 | Bar | 12.5 | 15 |
| 7 | Condensing temperature | ° F. | 118 | 131.6 | ° C. | 47.8 | 55.3 |
| 8 | Condenser air flow | CFM | 275.5 | 296.6 | Liter/Sec | 130 | 140 |
| 9 | Condenser fan pressure rise (Total) | inH2O | 4.3 | 4.3 | mbar | 10.7 | 10.7 |
| 10 | Condenser fan pressure rise (External) | inH2O | 2.8 | 2.8 | mbar | 7.0 | 7.0 |
| 11 | Condenser heat rejection | Btu/h | 6304 | 6607 | w | 1846.3 | 1935 |
| 12 | Chiller discharge air temperature | ° F. | 122.9 | 136.7 | ° C. | 50.5 | 58.2 |
| 13 | Chiller heat rejection | Btu/h | 9067 | 9571 | w | 2655.5 | 2803.1 |
| 14 | Power, Condenser Fan | w | 347.8 | 374.5 | w | 347.8 | 374.5 |

TABLE 1-continued

Refrigeration and Heat Discharge Unit Performance
Refrigeration and Heat Discharge Unit Performance

| Row | Measured Characteristic | IP Unit | Design 1 | Design 2 | SI Unit | Design 1 | Design 2 |
|---|---|---|---|---|---|---|---|
| 15 | Power for power supply | w | 100 | 100 | w | 100 | 100 |
| 16 | Power for e-box | w | 100 | 100 | w | 100 | 100 |
| 17 | Power and COP | | | | | | |
| 18 | Total Power Consumption | w | 1499.9 | 1644.5 | w | 1499.9 | 1644.5 |
| 19 | COP | | 0.51 | 0.47 | | 0.51 | 0.47 |
| 20 | Power factor | | 0.95 | 0.95 | | 0.95 | 0.95 |
| 21 | VA | VA | 1578.8 | 1731.05 | VA | 1578.8 | 1731.1 |

Figure 4:
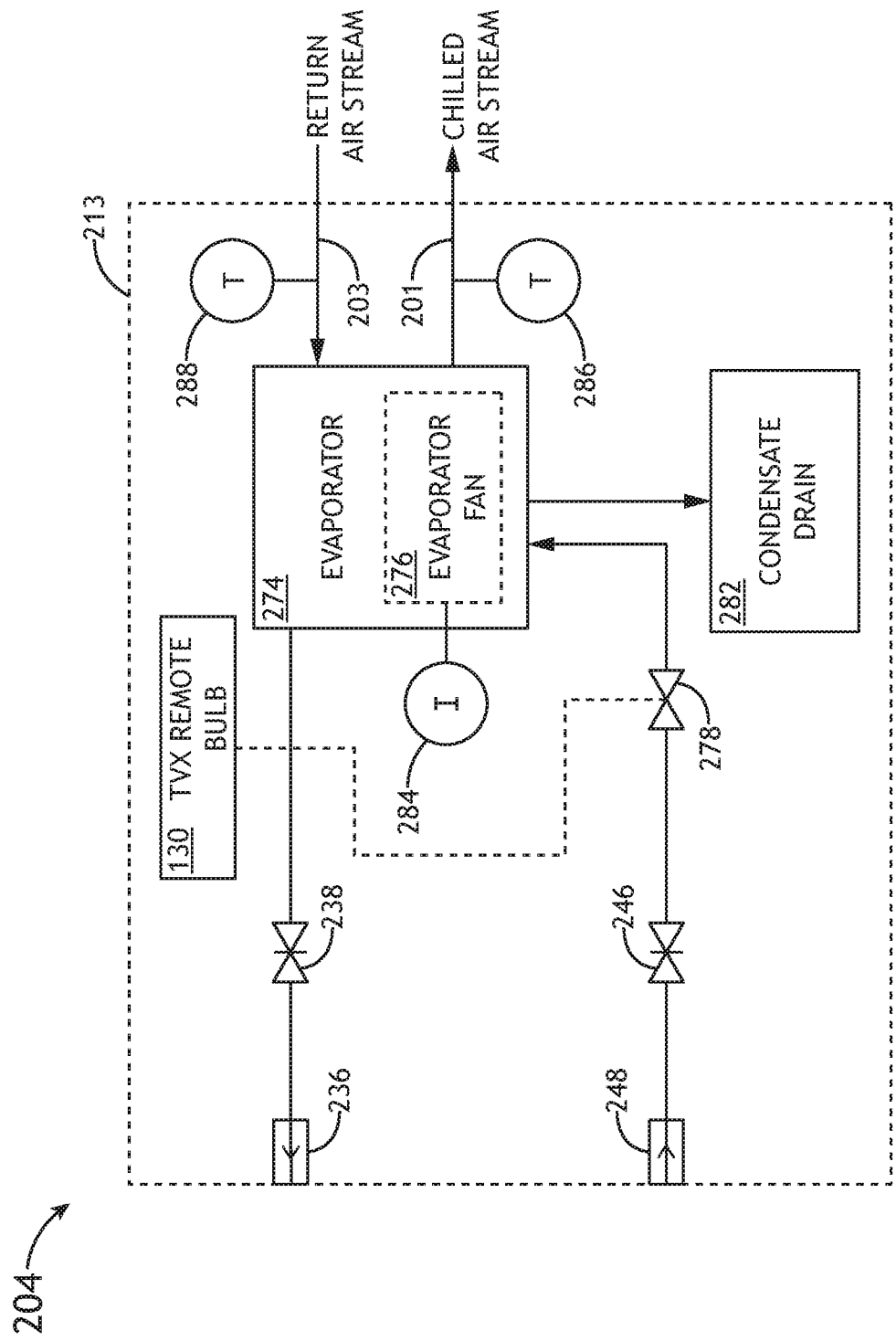
FIG. 4 illustrates a simplified flow diagram of a portion of a divided aircraft galley refrigeration system, in accordance with an example embodiment of the present disclosure.

FIG. 4 illustrates a simplified flow diagram of a portion of a divided aircraft galley refrigeration system, in accordance with an example embodiment of the present disclosure. Specifically, FIG. 4 illustrates the evaporating unit 204 of the divided aircraft galley refrigeration system 200, in accordance with an example embodiment of the present disclosure.

In embodiments, the evaporating unit 204 may include, but is not limited to, an evaporator 274, an evaporator fan 276, an expansion valve 278, a thermal expansion remote bulb 280 (TXV remote bulb 280), a condensate drain 282, a current sensor 284, a temperature sensor 286, and a temperature sensor 288. In embodiments, the components of the evaporating unit 204 may be contained within a single housing 213. For example, as noted previously herein, components of the evaporating unit 204 may be disposed within a housing 213, which is positioned within the aircraft galley. Furthermore, as noted previously herein with respect to FIG. 2, the quick disconnect assembly 236 may be disposed at a vapor refrigerant outlet port of the housing 213 of the evaporating unit 204. Similarly, quick disconnect assembly 248 may be disposed at a liquid refrigerant inlet port of the housing 213 of the evaporating unit 204. Quick disconnect assemblies 236, 248 may be configured to be couplable to the disconnect assemblies 218, 228 of the vapor refrigerant return 206 and the liquid refrigerant return 208, respectively.

It is noted herein that any discussion associated with the various components and streams of system 100 depicted in FIG. 1 may be regarded as applying to the various components and streams of the evaporating unit 204 depicted in FIG. 4, unless noted otherwise herein.

In embodiments, the evaporating unit 204 may be configured to provide a chilled air stream 201 which is sufficient to maintain a temperature of a chilled compartment of an aircraft galley between 0° C. and 4° C. In this regard, the evaporating unit 204 may be configured to maintain food and beverage products within the chilled compartment of the aircraft galley between 0° C. and 4° C. In other embodiments, the evaporating unit 204 may be configured to maintain a temperature of a chilled compartment of an aircraft galley below 0° C. For example, Table 2 below illustrates example operating metrics for the evaporating unit 204, in accordance with one or more embodiments of the present disclosure. In particular, Table 2 illustrates various performance metrics for two separate design iterations of the evaporating unit 204 (e.g., Design 1, and Design 2), in both IP and SI units.

TABLE 2

Evaporating Unit Performance
Evaporating Unit Performance

| Row | Measured Characteristic | IP Unit | Design 1 | Design 2 | SI Unit | Design 1 | Design 2 |
|---|---|---|---|---|---|---|---|
| 1 | Ambient Temperature | ° F. | 90 | 104 | ° C. | 32 | 40 |
| 2 | Chiller return air temperature | ° F. | 39.2 | 44.6 | ° C. | 4 | 7 |
| 3 | Chiller supply air temperature | ° F. | 30.3 | 35.7 | ° C. | -0.9 | 2.1 |
| 4 | Evaporator air flow | CFM | 254.3 | 254.3 | Liter/Sec | 120 | 120 |
| 5 | Evaporator fan pressure rise (Total) | inH2O | 4.7 | 4.7 | mbar | 11.7 | 11.7 |
| 6 | Evaporator fan pressure rise (External) | inH2O | 3.2 | 3.2 | mbar | 8 | 8 |
| 7 | Evaporating pressure | Psia | 33.8 | 37.9 | Bar | 2.3 | 2.6 |
| 8 | Evaporating temperature | ° F. | 21 | 26.4 | ° C. | -6.1 | -3.1 |
| 9 | Cooling capacity | Btu/h | 3824 | 3824 | w | 1120 | 1120 |
| 10 | Power, Evaporator Fan | w | 350.8 | 350.8 | w | 350.8 | 350.8 |
| 11 | Cooling capacity of chiller (Gross) | Btu/h | 2627.3 | 2627.3 | w | 770 | 770 |
| 12 | Cooling capacity of chiller (Average) | Btu/h | 2388.5 | 2388.5 | w | 700 | 700 |

Figure 5A:
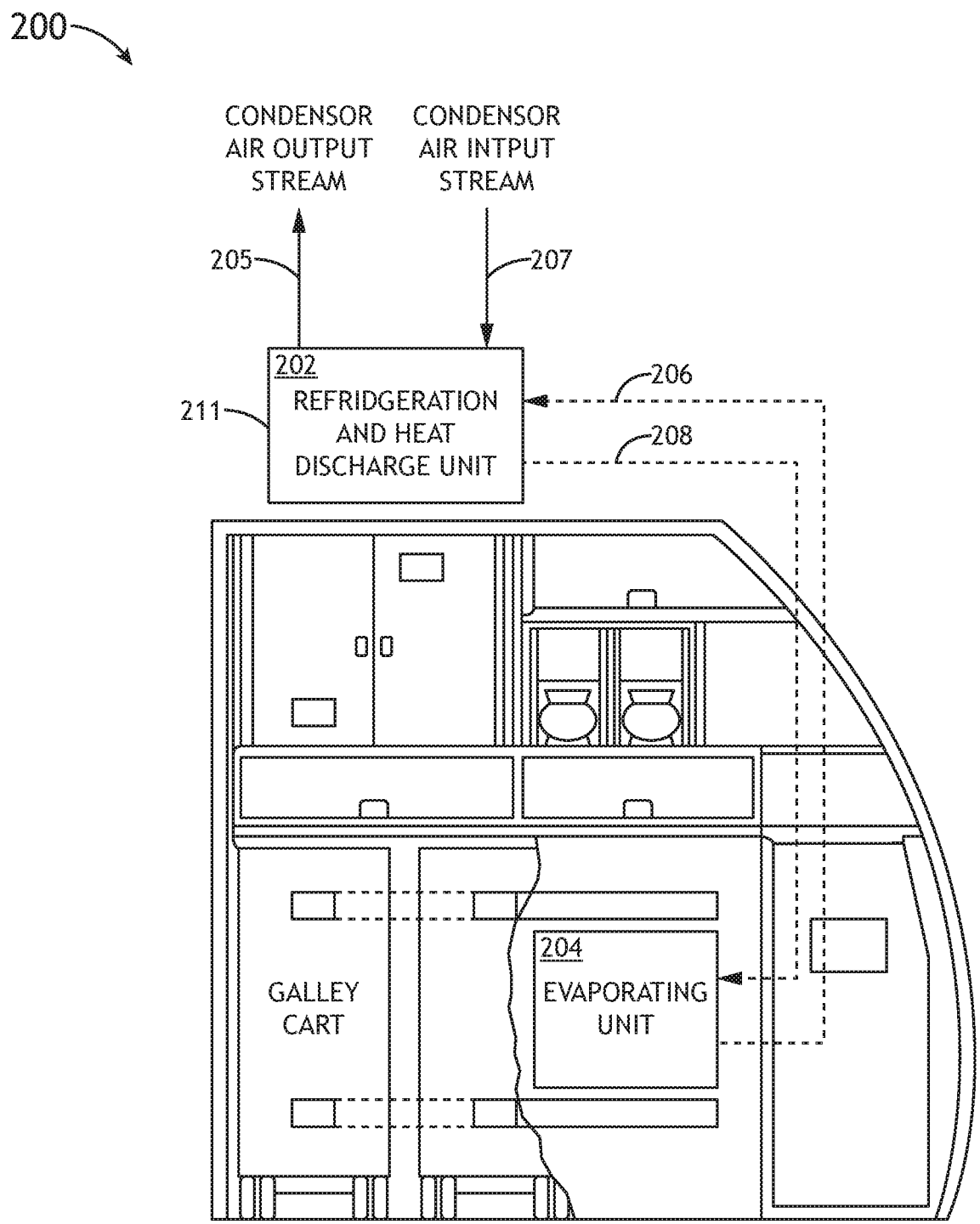
FIG. 5A illustrates a cross sectional view of an aircraft galley equipped with a divided aircraft galley refrigeration system, in accordance with an example embodiment of the present disclosure.
Figure 5B:
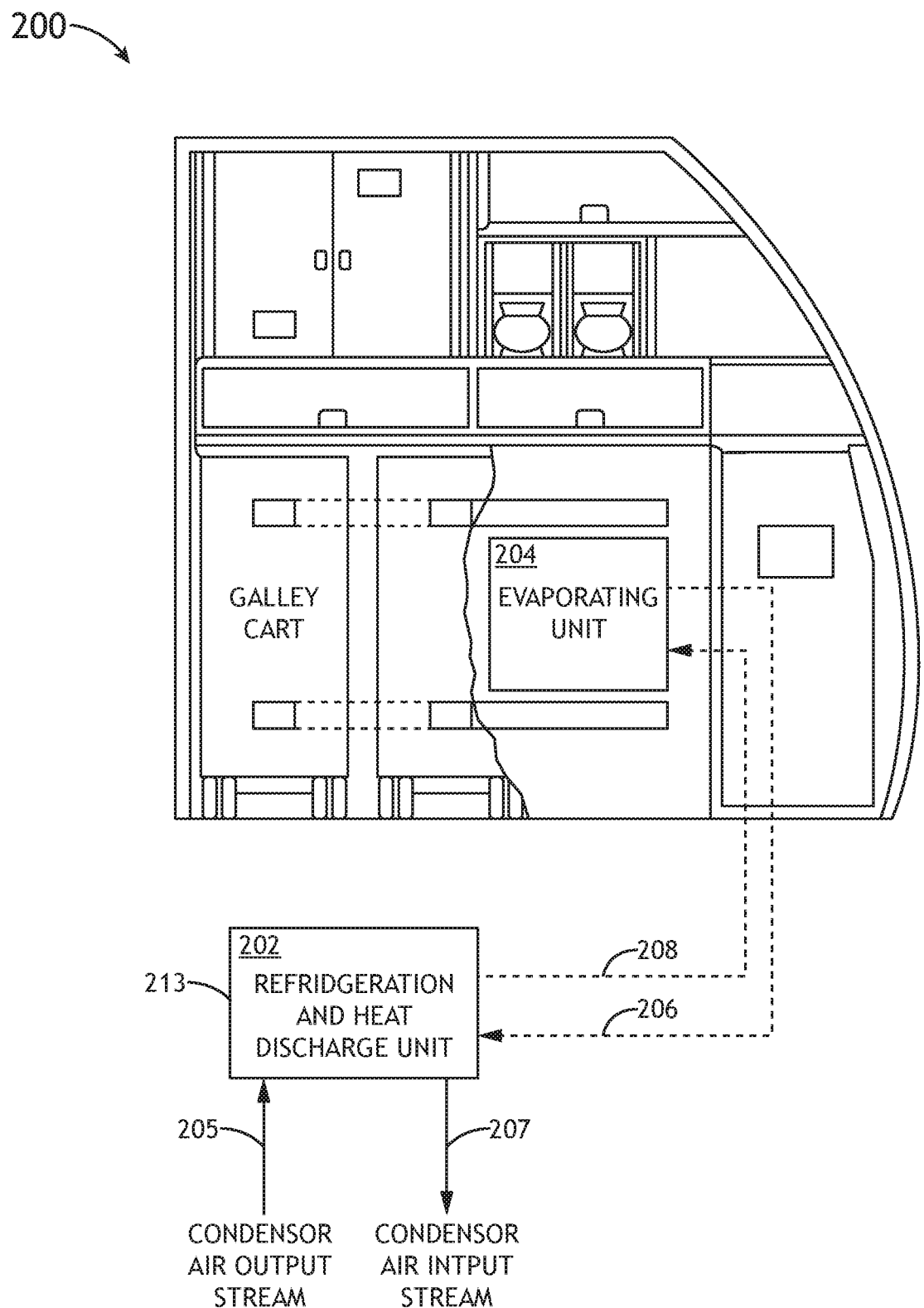
FIG. 5B illustrates a cross sectional view of an aircraft galley equipped with a divided aircraft galley refrigeration system, in accordance with an example embodiment of the present disclosure.

FIG. 5A illustrates a cross sectional view of an aircraft galley 500 equipped with a divided aircraft galley refrigeration system 200, in accordance with an example embodiment of the present disclosure. Similarly, FIG. 5B illustrates a cross sectional view of an aircraft galley 500 equipped with a divided aircraft galley refrigeration system 200, in accordance with an example embodiment of the present disclosure.

As noted previously herein, the divided aircraft galley refrigeration system 200 may be configured such that the evaporating unit 204 is positioned within the aircraft galley 500 of an aircraft (e.g., a chilled compartment of an aircraft galley 500), and the refrigeration and heat discharge unit 202 is positioned outside of the aircraft galley 500. The evaporating unit 204 and the refrigeration and heat discharge unit 202 may be fluidically and/or electrically coupled via a vapor refrigerant return 206 and a liquid refrigerant return 208, which may include flexible pipes. Additionally, the components of the evaporating unit 204 may be disposed within a housing 213, and the components of the refrigeration and heat discharge unit 202 may be disposed within a housing 211.

For example, as shown in FIG. 5A, the evaporating unit 204 (within housing 213) may be disposed within the aircraft galley 500, wherein the refrigeration and heat discharge unit 202 (within housing 211) may be disposed outside of the aircraft galley 500 such that the refrigeration and heat discharge unit 202 is positioned above the aircraft galley. By way of another example, as shown in FIG. 5B, the evaporating unit 204 (within housing 213) may be disposed within the aircraft galley 500, wherein the refrigeration and heat discharge unit 202 (within housing 211) may be disposed outside of the aircraft galley 500 such that the refrigeration and heat discharge unit 202 is positioned below the aircraft galley. It is noted herein that the refrigeration and heat discharge unit 202 may be positioned in any location outside of the aircraft galley 500 without departing from the spirit and scope of the present disclosure.

As noted previously herein, positioning the refrigeration and heat discharge unit 202 outside of the aircraft galley 500 may provide a number of advantages over previous approaches, including improved evaporating unit 204 performance, improved refrigeration and heat discharge unit 202 performance, improved use of special constraints within the aircraft galley 500, reduced noise within the aircraft galley 500 and/or aircraft cabin, and the like.

Figure 6:
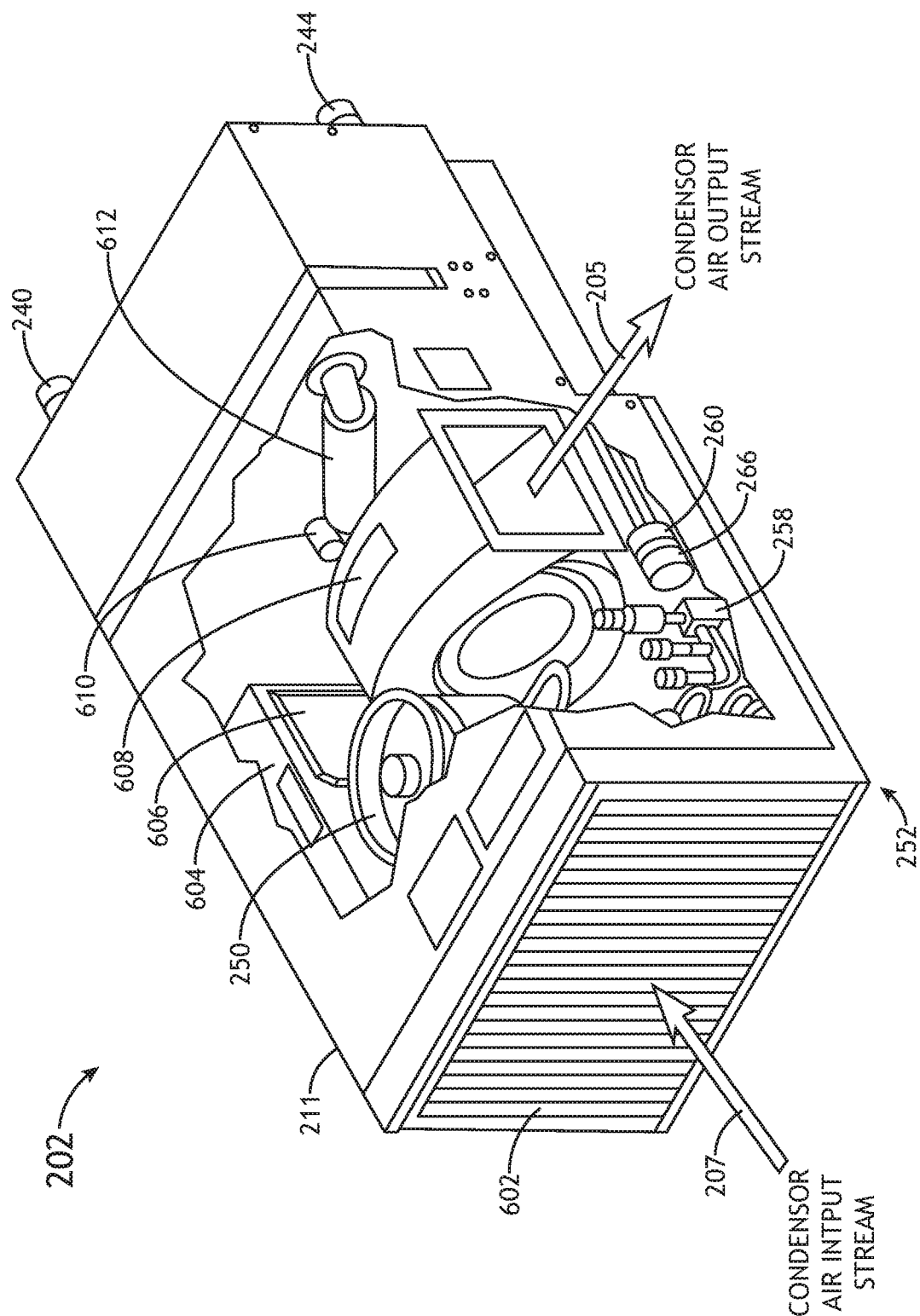
FIG. 6 illustrates a perspective view of a refrigeration and heat discharge unit in a horizontal configuration, in accordance with an example embodiment of the present disclosure.
Figure 7B:
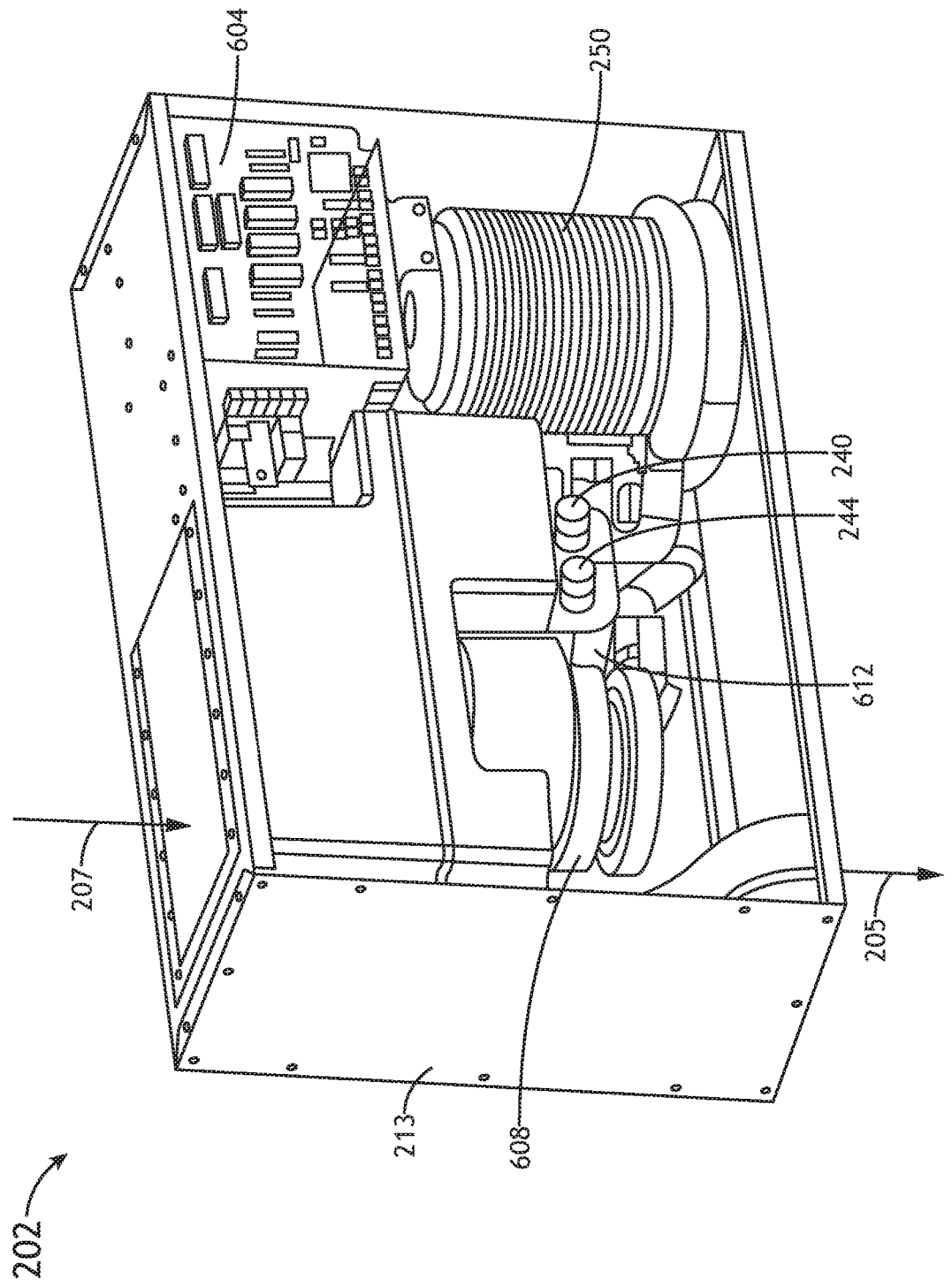
FIG. 7B illustrates a perspective view of a refrigeration and heat discharge unit in a vertical configuration, in accordance with an example embodiment of the present disclosure.

FIG. 6 illustrates a perspective view of a refrigeration and heat discharge unit 202 in a horizontal configuration, in accordance with an example embodiment of the present disclosure. FIG. 7A illustrates a perspective view of a refrigeration and heat discharge unit in a vertical configuration, in accordance with an example embodiment of the present disclosure. FIG. 7B illustrates a perspective view of a refrigeration and heat discharge unit in a vertical configuration, in accordance with an example embodiment of the present disclosure.

As shown in FIGS. 6-7B, the refrigeration and heat discharge unit 202 may include, but is not limited to, a compressor 250, a condenser 252, a condenser fan 254, a service block 258, a filter/dryer assembly 260, and a high-side pressure transducer 266. In other embodiments, the refrigeration and heat discharge unit 202 may further include an air filter 602 configured to filter the condenser air input stream 207, an electronic controller 604, an electromagnetic interference filter (EMI filter 606), a condenser fan motor assembly 608, a hot gas bypass valve 610, and a refrigerant line 612 configured to direct vapor and liquid refrigerant throughout the refrigeration and heat discharge unit 202.

It is contemplated herein that various components of the divided aircraft galley refrigeration system 200 (e.g., refrigeration and heat discharge unit 202, evaporating unit 204, and the like) may be configured and/or oriented in such a manner as to reduce the space consumed by system 200, and thereby conform to various space constraints of differing aircraft. For example, as shown in FIGS. 6-7B, it is contemplated herein that the refrigeration and heat discharge unit 202 may be configured in a horizontal or vertical orientation. The orientation of the refrigeration and heat discharge unit 202 may be dependent on a number of factors including, but not limited to, the location of the refrigeration and heat discharge unit 202, the type of aircraft, the space allotted for the refrigeration and heat discharge unit 202, and the like.

FIG. 8 illustrates an evaporating unit of a divided aircraft galley refrigeration system 200 installed within a chilled galley compartment, in accordance with an example embodiment of the present disclosure.

In embodiments, the evaporating unit 204 of the divided aircraft galley refrigeration system 200 may be positioned on a wall of the aircraft galley 500. For example, as shown in FIG. 8, the evaporating unit 204 contained within housing 213 may be disposed on a wall of a chilled compartment 800 of an aircraft galley. The chilled compartment 800 may include the aircraft galley 500 in its entirety, a portion of the aircraft galley 500, or the like.

In some embodiments, evaporating unit 204 may include an upper duct 802a and a lower duct 802b. In embodiments, the upper duct 802a and/or the lower duct 802b include a plurality of vents 804 disposed within the upper duct 802a and/or the lower duct 802b. For example, the upper duct 802a may include a plurality of vents 804a-804c disposed within the upper duct 802a configured to direct air into and/or out of the upper duct 802a. Similarly, the lower duct 802b may include a plurality of vents 804d-804f disposed within the lower duct 802b configured to direct air into and/or out of the lower duct 802b. In embodiments, the upper duct 802a and the lower duct 802b may be configured to direct air into and out of the evaporating unit. For example, the upper duct 802a may be configured to direct the chilled air stream 201 out of the evaporating unit 204 (and housing 213), such that air is directed out of the vents 804a-804c into the chilled compartment 800 (e.g., aircraft galley 500). By way of another example, the lower duct 802b may be configured to direct the return air stream 203 into the evaporating unit 204 (and housing 213), such that air is directed from the chilled compartment 800 (e.g., aircraft galley 500) into the vents 804d-804f, and into the evaporating unit 204. It is further contemplated herein, however, that the roles of the upper duct 802a and the lower duct 802b may be reversed, such that the upper duct 802a is configured to direct the return air stream 203 into the evaporating unit 204, and the lower duct 802b is configured to direct the chilled air stream 201 out of the evaporating unit 204.

Figure 9A:
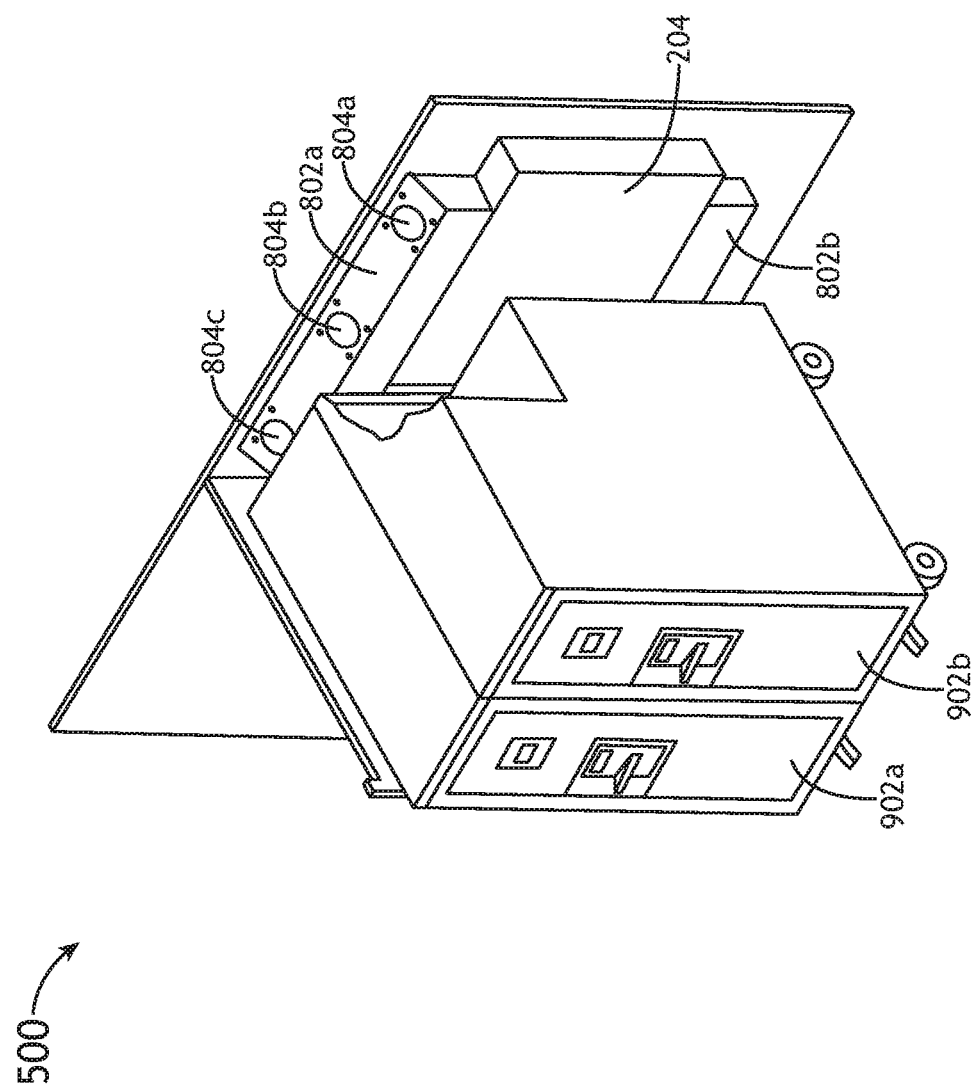
FIG. 9A illustrates a perspective view of a portion of an aircraft galley including an evaporating unit of a divided aircraft galley refrigeration system arranged in an air-over-cart configuration, in accordance with an example embodiment of the present disclosure.
Figure 9B:
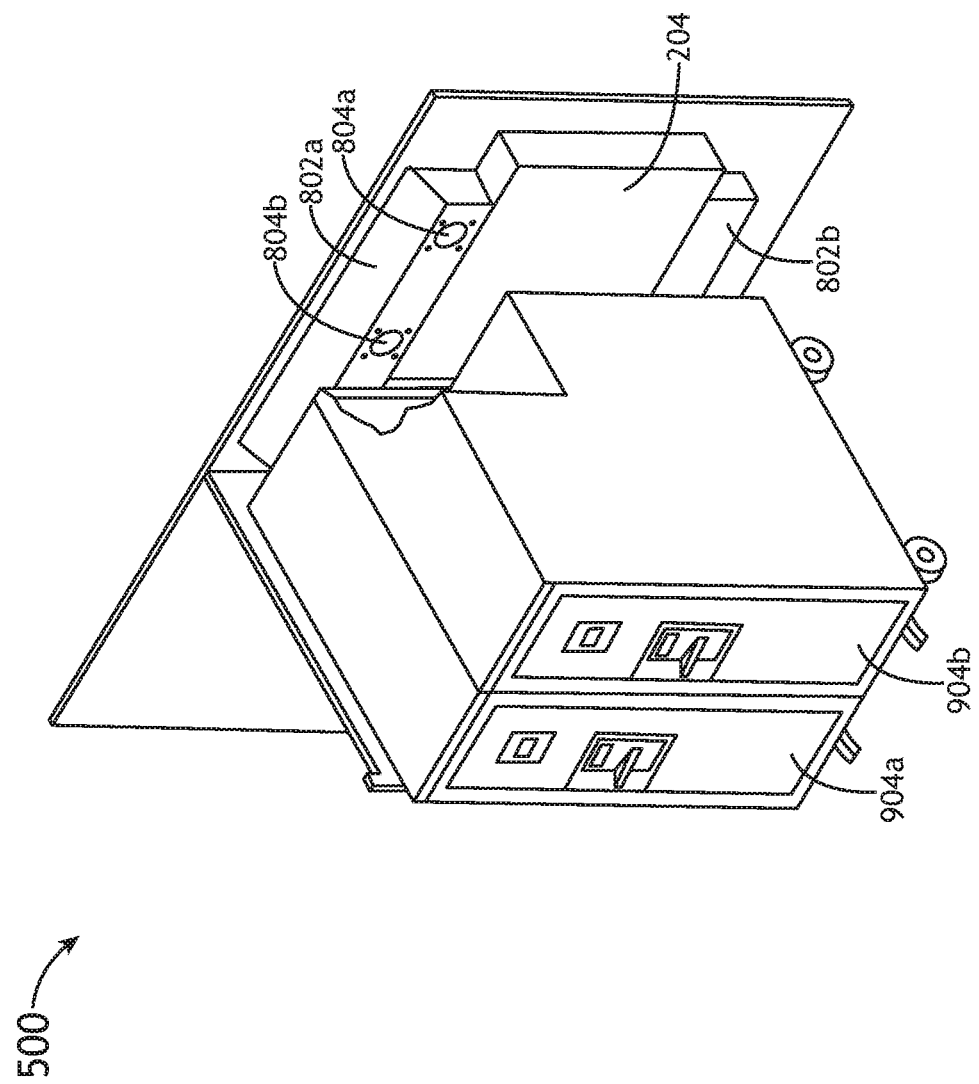
FIG. 9B illustrates a perspective view of a portion of an aircraft galley including an evaporating unit of a divided aircraft galley refrigeration system arranged in an air-through-cart configuration, in accordance with an example embodiment of the present disclosure.

FIG. 9A illustrates a perspective view of a portion of an aircraft galley 500 including an evaporating unit 204 of a divided aircraft galley refrigeration system 200 arranged in an air-over-cart configuration, in accordance with an example embodiment of the present disclosure. FIG. 9B illustrates a perspective view of a portion of an aircraft galley 500 including an evaporating unit 204 of a divided aircraft galley refrigeration system 200 arranged in an air-through-cart configuration, in accordance with an example embodiment of the present disclosure.

FIGS. 9A-9B illustrate galley carts 902a, 902b in a stored position within an aircraft galley 500. Galley carts 902a, 902b may be configured to store food and beverage products, such that the galley carts 902a, 902b may be removed from the galley 500 (e.g., removed from their stored position) and moved down the aisles of the aircraft in order to serve aircraft passengers. An aircraft galley 500 may be designed to house any number of galley carts 902.

In embodiments, the evaporating unit 204 of the divided aircraft galley refrigeration system 200 is configured to be disposed within the aircraft galley 500 such that the evaporating unit 204 is disposed behind one or more galley carts 902 when the one or more galley carts 902 are in a stored position. For example, as shown in FIG. 9A, the evaporating unit 204 may be disposed against a wall of the aircraft galley 500 such that the evaporating unit 204 is positioned behind the galley carts 902a, 902b when the galley carts 902a, 902b are in a stored position.

The evaporating unit 204, including upper duct 802a, lower duct 802b, and vents 804a-804f, may be configured to direct the chilled air stream 201 into a chilled compartment of the aircraft galley 500 in any configuration known in the art. For example, as shown in FIG. 9A, the evaporating unit 204 may be configured to direct the chilled air stream 201 into a chilled compartment of the aircraft galley 500 in an air-over-cart configuration. In the air-over-cart configuration, the chilled air stream 201 may be directed over the one galley carts 902a, 902b such that the chilled air stream is generally directed into the chilled compartment (e.g., aircraft galley 500). In an air-over-cart configuration, it is contemplated herein that the galley carts 902a, 902b may include a plurality of holes such that chilled air from the chilled air stream 201 and surrounding chilled compartment may enter the galley carts 902a, 902b and chill products stored within the galley carts 902a, 902b (e.g., chilled food products, chilled beverage products, and the like).

By way of another example, as shown in FIG. 9B, the evaporating unit 204 may be configured to direct the chilled air stream 201 directly into the one or more galley carts 902a, 902b in an air-through-cart configuration. In an air-through-cart configuration, the chilled air stream 201 may be directed directly into the one galley carts 902a, 902b while the galley carts are in the stored position through one or more openings within the galley carts 902a, 902b. In this regard, in a air-through-cart configuration, the chilled air stream 201 may be configured to chill the interiors of the galley carts 902a, 902b, rather than the entire aircraft galley 500. Accordingly, in an air-through-cart configuration, the "chilled compartment" may include the galley carts 902a, 902b rather than the entire aircraft galley 500.

Figure 10:
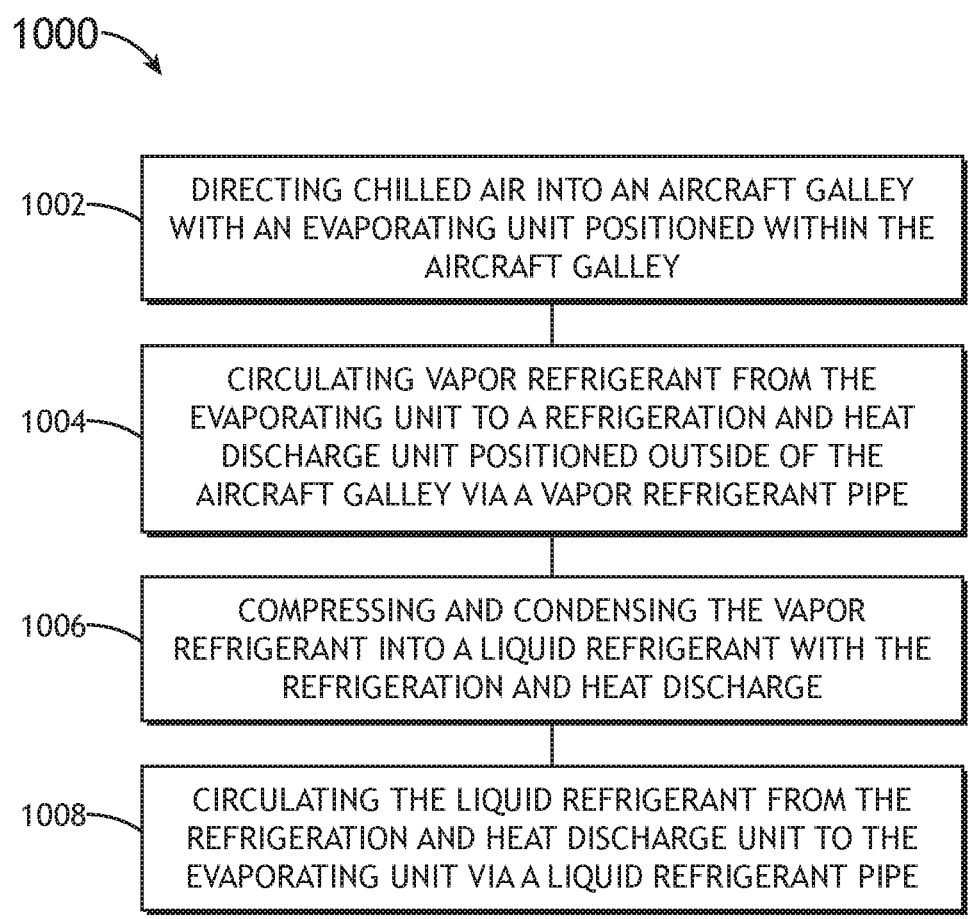
FIG. 10 illustrates a flowchart of a method for cooling a chilled compartment of an aircraft galley, in accordance with an example embodiment of the present disclosure.

FIG. 10 illustrates a flowchart of a method 1000 for cooling a chilled compartment of aircraft galley 500, in accordance with an example embodiment of the present disclosure. It is noted herein that the steps of method 1000 may be implemented all or in part by divided aircraft galley refrigeration system 200. It is further recognized, however, that the method 1000 is not limited to the divided aircraft galley refrigeration system 200 in that additional or alternative system-level embodiments may carry out all or part of the steps of method 1000.

In a step 1002, chilled air is directed into a chilled compartment of an aircraft galley with an evaporating unit positioned within the aircraft galley. For example, as shown in FIGS. 9A-9B, an evaporating unit 204 of a divided aircraft refrigeration system 200 may be positioned within an aircraft galley 500, and configured to direct a chilled air stream 201 into a chilled compartment of the aircraft galley 500. As noted previously herein, the chilled compartment of the aircraft galley 500 may include the entire aircraft galley 500, a portion of the aircraft galley 500, one or more galley carts 902a, 902b, and the like.

In a step 1004, vapor refrigerant is circulated form the evaporating unit to a refrigeration and heat discharge unit positioned outside of the aircraft galley via a vapor refrigerant pipe. For example, as shown in FIGS. 2 and 5A-5B, vapor refrigerant may be circulated from the evaporating unit 204 to a refrigeration and heat discharge unit 202 positioned outside of the aircraft galley 500 via a vapor refrigerant pipe 210. In embodiments, the vapor refrigerant pipe 210 is flexible. As shown in FIGS. 5A-5B, it is contemplated that the refrigeration and heat discharge unit 202 may be positioned in any location outside of the chilled compartment and/or aircraft galley 500.

In a step 1006, the vapor refrigerant is compressed and condensed into a liquid refrigerant with the refrigeration and heat discharge unit. For example, as shown in FIG. 3, a compressor 250 and condenser 252 may be configured to compress and condense the vapor refrigerant into a liquid refrigerant.

In a step 1008, the liquid refrigerant is circulated from the refrigeration and heat discharge unit 202 to the evaporating unit via a liquid refrigerant pipe. For example, as shown in FIGS. 2 and 5A-5B, liquid refrigerant may be circulated from the refrigeration and heat discharge unit 202 to the evaporating unit 204 positioned within the aircraft galley 500 via a liquid refrigerant pipe 220. In embodiments, the liquid refrigeration pipe 220 may be flexible.

Figure 11:
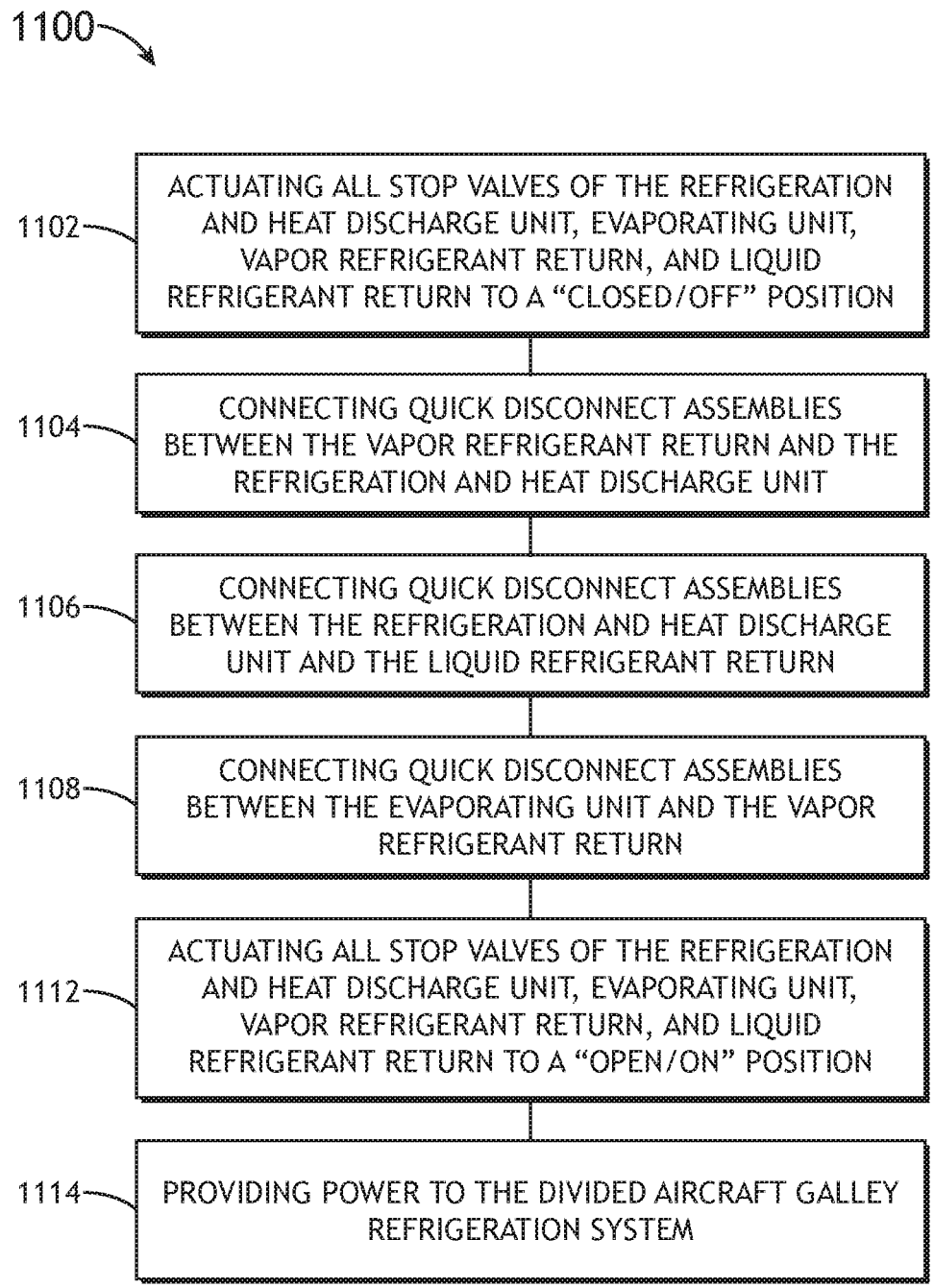
FIG. 11 illustrates a flowchart of a method for installing a divided aircraft galley refrigeration system, in accordance with an example embodiment of the present disclosure.

FIG. 11 illustrates a flowchart of a method for installing a divided aircraft galley refrigeration system, in accordance with an example embodiment of the present disclosure. It is further recognized, however, that the method 1100 is not limited to the divided aircraft galley refrigeration system 200 in that additional or alternative system-level embodiments may carry out all or part of the steps of method 1100.

In a step 1102, all the stop valves of the refrigeration and heat discharge unit, evaporating unit, vapor refrigerant return, and liquid refrigerant return are actuated to a "CLOSED/OFF" position. For example, referring to FIG. 2, the stop valves 214 and 216 of the vapor refrigerant return 206 may be actuated to a "CLOSED/OFF" position. Similarly, the stop valves 238, 242 of the refrigeration and heat discharge unit 202, the stop valves 224, 226 of the liquid refrigerant return 208, and the stop valves 234 and 246 of the evaporating unit may be actuated to a "CLOSED/OFF" position.

In a step 1104, the quick disconnect assemblies between the vapor refrigerant return 206 and the refrigeration and heat discharge unit 202 (e.g., quick disconnect assemblies 212, 240) are connected.

In a step 1106, the quick disconnect assemblies between the refrigeration and heat discharge unit 202 and the liquid vapor return 208 (e.g., quick disconnect assemblies 244, 222) are connected.

In a step 1108, the quick disconnect assemblies between the liquid refrigerant return 208 and the evaporating unit 204 (e.g., quick disconnect assemblies 228, 248) are connected.

In a step 1110, the quick disconnect assemblies between the evaporating unit 204 and the vapor refrigerant return 206 (e.g., quick disconnect assemblies 236, 218) are connected.

In a step 1112, all the stop valves of the refrigeration and heat discharge unit, evaporating unit, vapor refrigerant return, and liquid refrigerant return are actuated to a "OPEN/ON" position. For example, referring to FIG. 2, the stop valves 214 and 216 of the vapor refrigerant return 206 may be actuated to a "OPEN/ON" position. Similarly, the stop valves 238, 242 of the refrigeration and heat discharge unit 202, the stop valves 224, 226 of the liquid refrigerant return 208, and the stop valves 234 and 246 of the evaporating unit may be actuated to a "OPEN/ON" position.

In a step 1114, power is provided to the divided aircraft galley refrigeration system. For example, one or more switches may be activated which provides electrical power to various components of the divided aircraft galley refrigeration system 200 including, but not limited to, the refrigeration and heat discharge unit 202, the evaporating unit 204, and the like.

Figure 12:
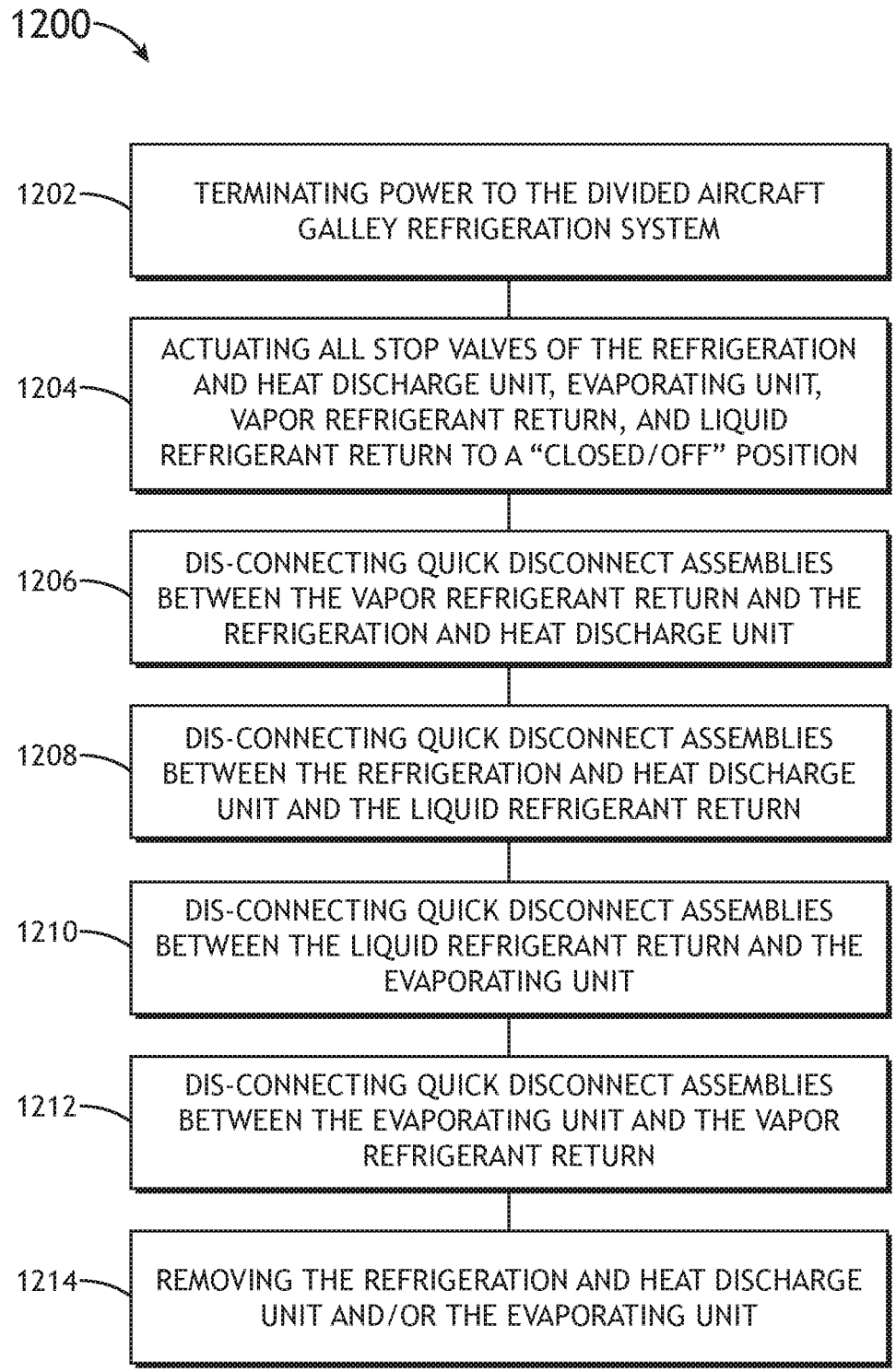
FIG. 12 illustrates a flowchart of a method for removing a component of a divided aircraft galley refrigeration system, in accordance with an example embodiment of the present disclosure.

FIG. 12 illustrates a flowchart of a method for removing a component of a divided aircraft galley refrigeration system, in accordance with an example embodiment of the present disclosure. It is further recognized, however, that the method 1200 is not limited to the divided aircraft galley refrigeration system 200 in that additional or alternative system-level embodiments may carry out all or part of the steps of method 1200.

It is noted herein that refrigeration and heat discharge units of previous aircraft galley refrigeration systems often have to be taken out and removed from the aircraft for service and maintenance. In previous systems, this would entail removing the entire refrigeration system from the aircraft. This can be a very time consuming and tedious process. Additionally, in order to remove the refrigeration and heat discharge unit 202 without spilling and/or losing large amounts of refrigerant, the refrigerant material within the previous refrigeration systems would have to be removed prior to taking out the refrigeration and heat discharge unit for service.

Accordingly, embodiments of the present disclosure are directed to a method 1200 for removing at least one of the refrigeration and heat discharge unit 202 or the evaporating unit 204. In particular, embodiments of the present disclosure are directed to a method 1200 for removing at least one of the refrigeration and heat discharge unit 202 or the evaporating unit 204 without having to drain the refrigerant material from the divided aircraft galley refrigeration system 200. Further embodiments of the present disclosure are directed to a method 1200 for removing at least one of the refrigeration and heat discharge unit 202 or the evaporating unit 204 without having to remove the entire divided aircraft galley refrigeration system 200. It is contemplated herein that the method 1200 of the present disclosure may provide for simplified removal, service, and maintenance of the components of the divided aircraft galley refrigeration system 200.

In a step 1202, power provided to the divided aircraft galley refrigeration system 200 is terminated. For example, one or more switches which provide electrical power to various components of the divided aircraft galley refrigeration system 200 may be deactivated.

In a step 1204, all the stop valves of the refrigeration and heat discharge unit, evaporating unit, vapor refrigerant return, and liquid refrigerant return are actuated to a "CLOSED/OFF" position. For example, referring to FIG. 2, the stop valves 214 and 216 of the vapor refrigerant return 206 may be actuated to a "CLOSED/OFF" position. Similarly, the stop valves 238, 242 of the refrigeration and heat discharge unit 202, the stop valves 224, 226 of the liquid refrigerant return 208, and the stop valves 234 and 246 of the evaporating unit may be actuated to a "CLOSED/OFF" position.

In a step 1206, the quick disconnect assemblies between the vapor refrigerant return 206 and the refrigeration and heat discharge unit 202 (e.g., quick disconnect assemblies 212, 240) are dis-connected.

In a step 1208, the quick disconnect assemblies between the refrigeration and heat discharge unit 202 and the liquid vapor return 208 (e.g., quick disconnect assemblies 244, 222) are dis-connected.

In a step 1210, the quick disconnect assemblies between the liquid refrigerant return 208 and the evaporating unit 204 (e.g., quick disconnect assemblies 228, 248) are dis-connected.

In a step 1212, the quick disconnect assemblies between the evaporating unit 204 and the vapor refrigerant return 206 (e.g., quick disconnect assemblies 236, 218) are dis-connected.

In a step 1214, the refrigeration and heat discharge unit 1214 and/or the evaporating unit 204 is removed. The refrigeration and heat discharge unit 1214 and/or the evaporating unit 204 may be removed for service, regular maintenance, diagnosis, and/or unit replacement.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken as limiting.

The previous description is presented to enable one of ordinary skill in the art to make and use the invention as provided in the context of a particular application and its requirements. As used herein, directional terms such as "top," "bottom," "over," "under," "upper," "upward," "lower," "down," and "downward" are intended to provide relative positions for purposes of description, and are not intended to designate an absolute frame of reference. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

It is further contemplated that each of the embodiments of the method described above may include any other step(s) of any other method(s) described herein. In addition, each of the embodiments of the method described above may be performed by any of the systems described herein.

The herein described subject matter sometimes illustrates different components contained within, or connected with, other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "connected," or "coupled," to each other to achieve the desired functionality, and any two components capable of being so associated can also be viewed as being "couplable," to each other to achieve the desired functionality. Specific examples of couplable include but are not limited to physically mateable and/or physically interacting components and/or wirelessly interactable and/or wirelessly interacting components and/or logically interacting and/or logically interactable components.

Furthermore, it is to be understood that the invention is defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," and the like). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, and the like" is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, and the like). In those instances where a convention analogous to "at least one of A, B, or C, and the like" is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, and the like). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

It is believed that the present disclosure and many of its attendant advantages will be understood by the foregoing description, and it will be apparent that various changes may be made in the form, construction and arrangement of the components without departing from the disclosed subject matter or without sacrificing all of its material advantages.

The form described is merely explanatory, and it is the intention of the following claims to encompass and include such changes. Furthermore, it is to be understood that the invention is defined by the appended claims.

What is claimed:

1. A divided aircraft galley refrigeration system, comprising:
   an aircraft galley comprising at least one chilled compartment configured for storage of one or more galley carts;
   a system controller for managing a temperature of the chilled compartment within a selected range;
   an evaporating unit positioned within the chilled compartment on a wall of the aircraft galley, said evaporating unit including an evaporator fan, an expansion valve configured to evaporate a liquid refrigerant, and a current sensor configured to transmit data to said system controller, wherein the evaporating unit is configured to direct chilled air over the one or more aircraft galley carts in an air-over-cart configuration;
   a refrigeration and heat discharge unit positioned outside of the aircraft galley, the refrigeration and heat discharge unit including a compressor, a condenser, and a sub-cooler;
   a liquid refrigerant pipe configured to fluidically couple the evaporating unit and the refrigeration and heat discharge unit and direct the liquid refrigerant from the refrigeration and heat discharge unit to the evaporating unit;
   and
   a vapor refrigerant pipe configured to fluidically couple the evaporating unit and the refrigeration and heat discharge unit and direct vapor refrigerant from the evaporating unit to the refrigeration and heat discharge unit.

2. The system of claim 1, wherein the selected range is between 28° F. and 46° F., wherein the refrigeration and heat discharge unit includes a total power consumption between 1499.9 watts and 1644.5 watts.

3. The system of claim 1, wherein the refrigeration and heat discharge unit is positioned above the aircraft galley.

4. The system of claim 1, wherein at least one of the liquid refrigerant pipe or the vapor refrigerant pipe is flexible.

5. The system of claim 1, wherein at least one of the liquid refrigerant pipe and the vapor refrigerant pipe comprise pre-charge refrigerant pipes.

6. The system of claim 1,
   wherein the liquid refrigerant pipe includes a first quick disconnect assembly at a first end of the liquid refrigerant pipe, and a second quick disconnect assembly at a second end of the liquid refrigerant pipe.

7. The system of claim 6, wherein the first quick disconnect assembly comprises a first stop valve-quick disconnect apparatus, and the second quick disconnect assembly comprises a second stop valve-quick disconnect apparatus.

8. The system of claim 6,
   wherein the refrigeration and heat discharge unit includes a quick disconnect assembly at a liquid refrigerant outlet port,
   wherein the evaporating unit includes a quick disconnect assembly at a liquid refrigerant inlet port,
   wherein the first quick disconnect assembly of the liquid refrigerant pipe is couplable to the quick disconnect assembly at the liquid refrigerant outlet port of the refrigeration and heat discharge unit, wherein the second quick disconnect assembly of the liquid refrigerant pipe is couplable to the quick disconnect assembly at the liquid refrigerant inlet port of the evaporating unit.

9. The system of claim 1,
wherein the vapor refrigerant pipe includes a first quick disconnect assembly at a first end of the vapor refrigerant pipe, and a second quick disconnect assembly at a second end of the vapor refrigerant pipe.

10. The system of claim 9, wherein the first quick disconnect assembly comprises a first stop valve-quick disconnect apparatus, and the second quick disconnect assembly comprises a second stop valve-quick disconnect apparatus.

11. The system of claim 9,
wherein the refrigeration and heat discharge unit includes a quick disconnect assembly at a vapor refrigerant input port,
wherein the evaporating unit includes a quick disconnect assembly at a vapor refrigerant outlet port,
wherein the first quick disconnect assembly of the vapor refrigerant pipe is couplable to the quick disconnect assembly at the vapor refrigerant inlet port of the refrigeration and heat discharge unit,
wherein the second quick disconnect assembly of the vapor refrigerant pipe is couplable to the quick disconnect assembly at the vapor refrigerant outlet port of the evaporating unit.

12. The system of claim 1, further comprising one or more air ducts fluidically coupled to the evaporating unit, wherein the one or more air ducts are configured to direct chilled air from the evaporating unit.

13. A system, comprising:
an aircraft galley comprising at least one compartment configured for storage of one or more galley carts;
a system controller for managing a temperature of the one or more galley carts within a selected range;
an evaporating unit positioned within the compartment on a wall of the aircraft galley, said evaporating unit including an evaporator fan, an expansion valve configured to evaporate a liquid refrigerant, and a current sensor configured to transmit data to the system controller, wherein the evaporating unit is configured to direct chilled air over the one or more aircraft galley carts in an air-through-cart configuration;
a refrigeration and heat discharge unit positioned outside of the aircraft galley, said refrigeration and heat discharge unit including a compressor, a condenser, and a sub-cooler;
a liquid refrigerant pipe configured to fluidically couple the evaporating unit and the refrigeration and heat discharge unit and direct the liquid refrigerant from the refrigeration and heat discharge unit to the evaporating unit; and
a vapor refrigerant pipe configured to fluidically couple the evaporating unit and the refrigeration and heat discharge unit and direct vapor refrigerant from the evaporating unit to the refrigeration and heat discharge unit.

14. The system of claim 13,
wherein the liquid refrigerant pipe includes a first stop valve-quick disconnect assembly at a first end of the liquid refrigerant pipe, and a second stop valve-quick disconnect assembly at a second end of the liquid refrigerant pipe,
and
wherein the vapor refrigerant pipe includes a first stop valve-quick disconnect assembly at a first end of the liquid refrigerant pipe, and a second stop valve-quick disconnect assembly at a second end of the vapor refrigerant pipe.

15. The system of claim 14,
wherein the refrigeration and heat discharge unit includes a first stop valve-quick disconnect assembly at a vapor refrigerant inlet port, and a second stop valve-quick disconnect assembly at a liquid refrigerant outlet port,
wherein the first stop valve-quick disconnect assembly of the vapor refrigerant pipe is couplable to the first stop valve-quick disconnect assembly at the vapor refrigerant inlet port of the refrigeration and heat discharge unit,
wherein the first stop valve-quick disconnect assembly of the liquid refrigerant pipe is couplable to the second stop valve-quick disconnect assembly at the liquid refrigerant outlet port of the refrigeration and heat discharge unit.

16. The system of claim 14,
wherein the evaporating unit includes a first stop valve-quick disconnect assembly at a liquid refrigerant inlet port, and a second stop valve-quick disconnect assembly at a vapor refrigerant outlet port,
wherein the second stop valve-quick disconnect assembly of the liquid refrigerant pipe is couplable to the first stop valve-quick disconnect assembly at the liquid refrigerant inlet port of the evaporating unit,
wherein the second stop valve-quick disconnect assembly of the vapor refrigerant pipe is couplable to the second stop valve-quick disconnect assembly at the vapor refrigerant outlet port of the evaporating unit.

* * * * *